(12) United States Patent
Leith

(10) Patent No.: US 8,360,165 B2
(45) Date of Patent: Jan. 29, 2013

(54) VEHICLE MOUNTED IMPLEMENT MOVEMENT CONTROL APPARATUS AND METHODS

(76) Inventor: Randy W. Leith, Howard, SD (US)

( * ) Notice: Subject to any disclaimer, the term of this patent is extended or adjusted under 35 U.S.C. 154(b) by 145 days.

(21) Appl. No.: 12/887,180

(22) Filed: Sep. 21, 2010

(65) Prior Publication Data

US 2011/0083867 A1    Apr. 14, 2011

Related U.S. Application Data

(60) Provisional application No. 61/277,264, filed on Sep. 21, 2009.

(51) Int. Cl.
*A01B 59/048*    (2006.01)
(52) U.S. Cl. ......................................................... 172/821
(58) Field of Classification Search ............ 37/232–236; 172/810–834, 789, 734, 791–797
See application file for complete search history.

(56) References Cited

U.S. PATENT DOCUMENTS

| | | | |
|---|---|---|---|
| 4,221,267 A | 9/1980 | Asal et al. | |
| 6,059,048 A | 5/2000 | Subrt | |
| 6,286,606 B1 | 9/2001 | Krieg et al. | |
| 6,827,155 B1 | 12/2004 | Hoffart | |
| 6,907,941 B1 | 6/2005 | Hoffart | |
| 6,955,229 B1 | 10/2005 | Hoffart | |
| 7,131,502 B1 | 11/2006 | Hoffart | |

OTHER PUBLICATIONS

Belly Blade Brochure by GrouserProducts,WWW.GROUSER.COM, not later than Jun. 30, 2010.
U.S. Appl. No. 61/277,264, filed Sep. 21, 2009.

*Primary Examiner* — Robert Pezzuto
(74) *Attorney, Agent, or Firm* — Santangelo Law Offices, P.C.

(57) ABSTRACT

Embodiments of the inventive technology present novel methods of controlling the movement, in several degrees of freedom, of an implement mounted to and supported by a motor vehicle (e.g., a tractor). Particular embodiments may focus on the use of actuators attached (at an end) to a movable frame (which may have a shaft running at least partially therethrough) to control the motion of an implement assembly. A related novel method of operation is also disclosed.

67 Claims, 39 Drawing Sheets

LIFT / LOWER TILT BRACKET

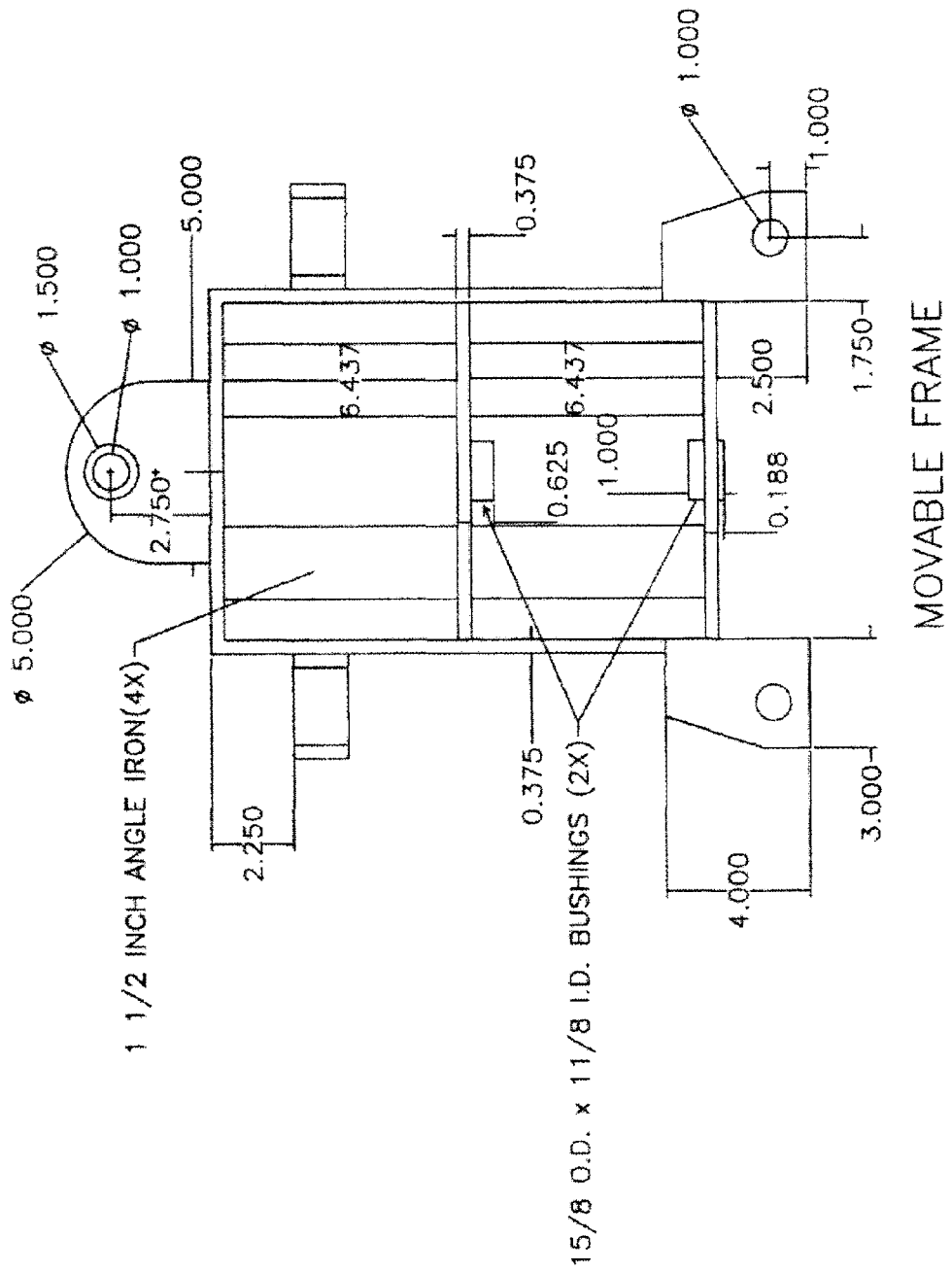
Fig. 23A MOVABLE FRAME

MOVABLE FRAME

MOVABLE FRAME

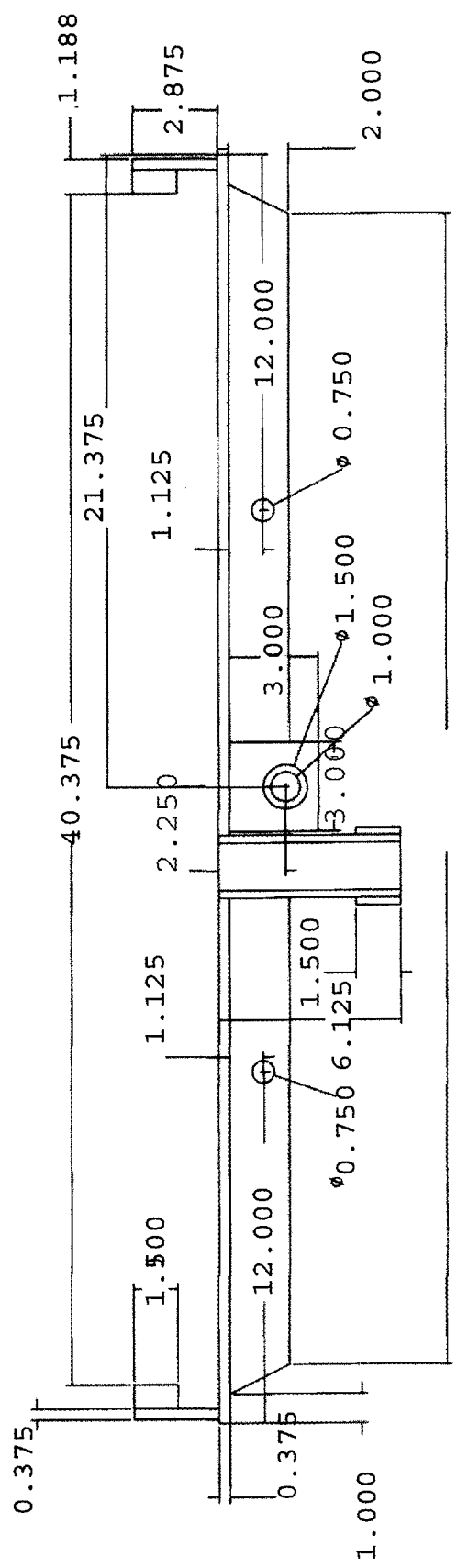
Fig. 24A FORE AND AFT BRACKET

FORE AND AFT BRACKET

FORE AND AFT BRACKET

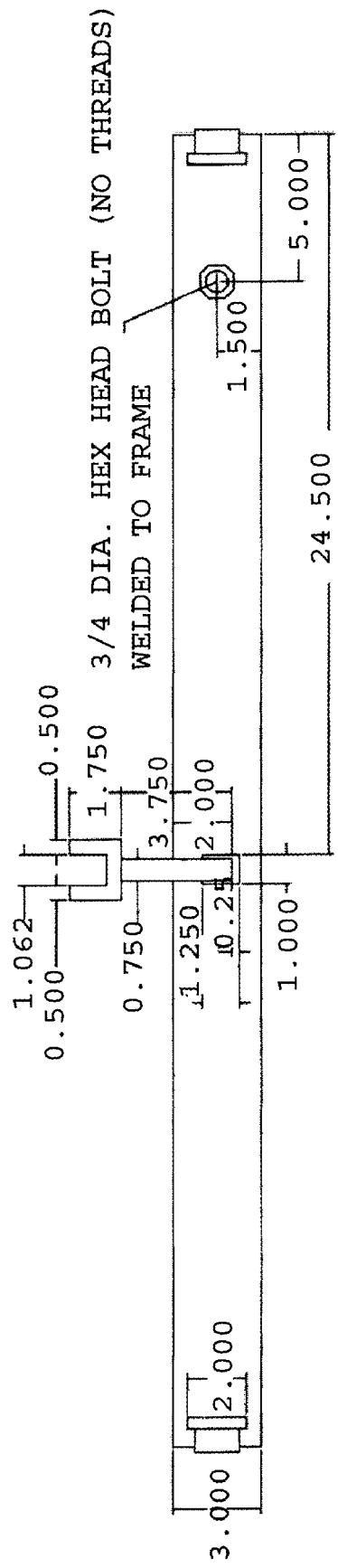

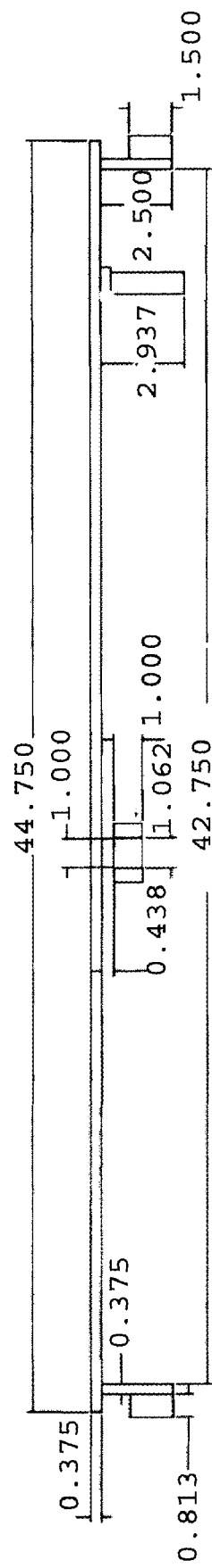
Fig. 25B BLADE PITCH BRACKET

BLADE PITCH BRACKET

SLIDE ASSEMBLY

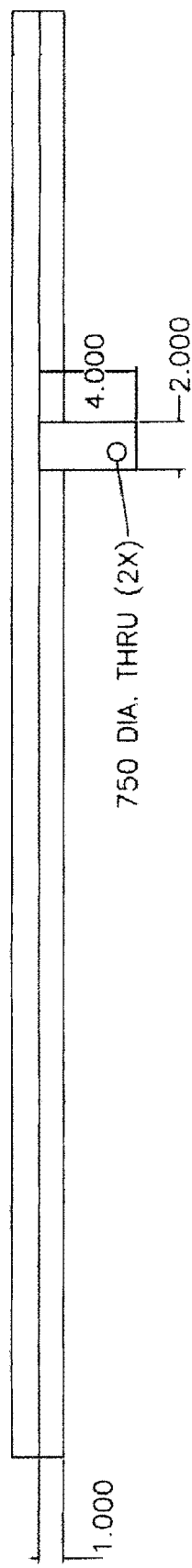
Fig. 26B SLIDE ASSEMBLY

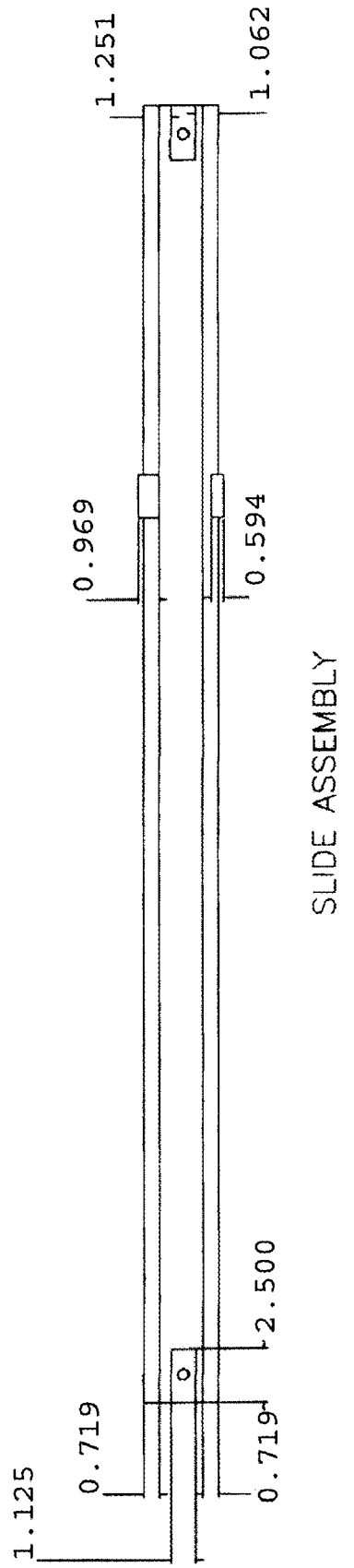
Fig. 26C SLIDE ASSEMBLY

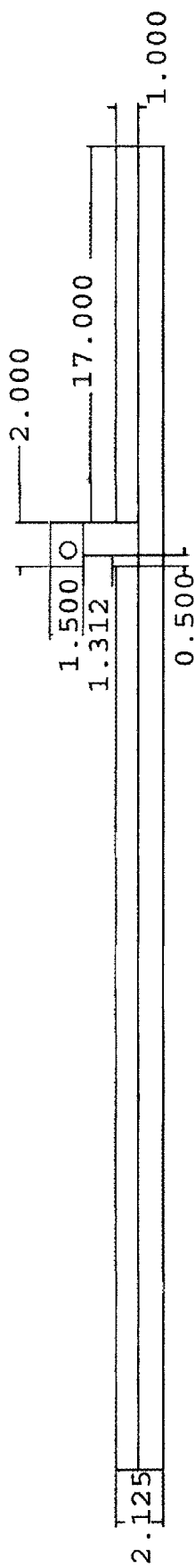
Fig. 26D SLIDE ASSEMBLY

SLIDE ASSEMBLY

CASE IH 200 SERIES MOUNTING BRACKET

CASE IH 200 SERIES MOUNTING BRACKET

CASE IH 200 SERIES MOUNTING BRACKET

US 8,360,165 B2

VEHICLE MOUNTED IMPLEMENT MOVEMENT CONTROL APPARATUS AND METHODS

This non-provisional application claims priority to U.S. Prov. App. No. 61/277,264, filed Sep. 21, 2009, the provisional application hereby incorporated herein in its entirety.

BACKGROUND

An implement mounting and movement control apparatus, in embodiments, mountable to vehicles such as tractors (regardless of size), is disclosed. Typical applications include control of movement of graders, brooms, rippers, core plug aerators, dethatchers, and landscape rakes, as but a few examples.

Conventional implement mounting structures have been heavy and hard to install. Attachments were difficult to change, which was labor intensive, time consuming, and required many tools. Complex attachment and implement movement control systems have compromised durability and caused high purchase and repair costs.

The inventive technology disclosed herein, in embodiments, mitigates one or more of these drawbacks. For example, installation, and removal, is comparatively facile and fast. Attachments, (grader blade, broom, core plug aerator, dethatcher, or landscape rake, as but a few examples), in particular embodiments, may have just two attachment points (e.g., threaded bolts and nuts. etc.). Further, in particular embodiments, the entire unit, except for the mounting brackets and the rear support bracket, can be removed by disconnecting hydraulic quick couplings and removing a few pins. Further, mounting brackets do not interfere with operation of the tractor or a front end loader and can remain on the tractor. The disclosed technology, in embodiments, is light weight in comparison to many previous apparatus. It offers a simple, robust solution to the problem of multi-degree of freedom movement control of a vehicle attached implement. In embodiments, the inventive technology is capable of implement lift/lower, implement fore/aft movement, enhanced implement pitch, implement tilt, and also implement side to side movement (known as side shift). Other objects and advantages may be described elsewhere in the application, including in the following description and the figures. The following figure descriptions, and the figures themselves, are exemplary only and should not be used to limit the inventive technology in any manner.

BRIEF DESCRIPTION OF THE FIGURES

FIG. 12 also shows the rear fore/aft actuator mounting brackets, the lower tilt actuator bracket and the rear fore/aft hitch bracket in an embodiment of the inventive apparatus.

FIGS. 23A-C show a movable frame as may be found in an embodiment of the inventive technology.

FIGS. 24A-C show a fore and aft bracket as may be found in an embodiment of the inventive technology.

FIGS. 25A-C show an enhanced implement pitch bracket as may be found in an embodiment of the inventive technology.

FIGS. 26A-E show a slide carriage and related componentry as may be found in an embodiment of the inventive technology.

DESCRIPTION OF PREFERRED EMBODIMENTS

Figure 1A:
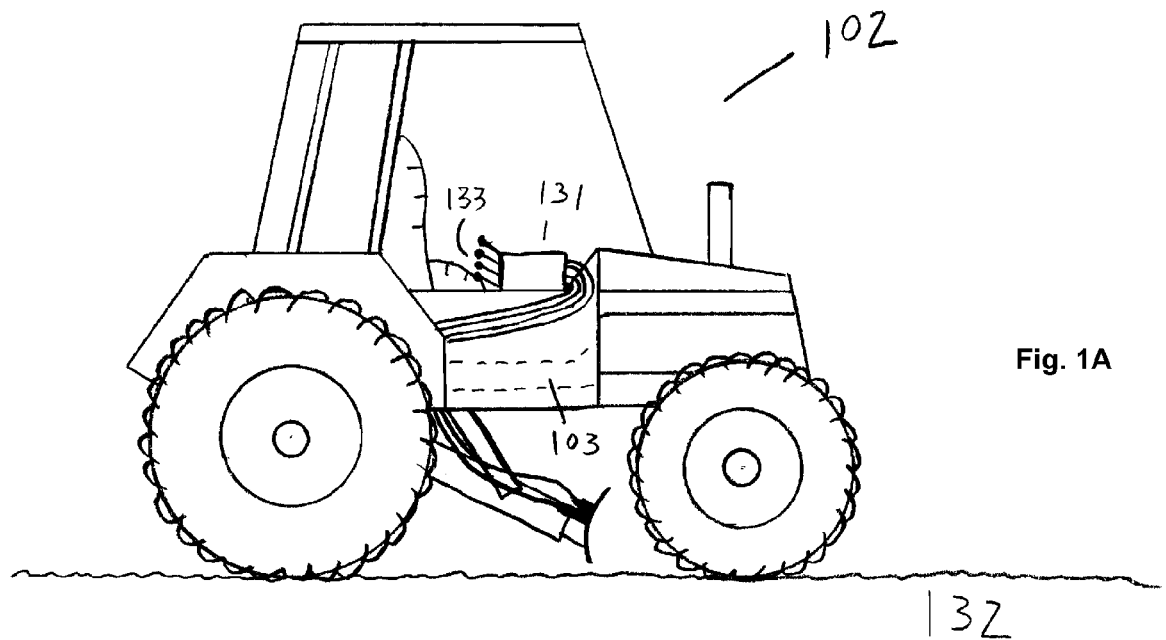
FIG. 1A shows a side view of a tractor with the one embodiment of the apparatus belly mounted thereto. The apparatus is shown in only a very skeletal manner for clarity.
Figure 1B:
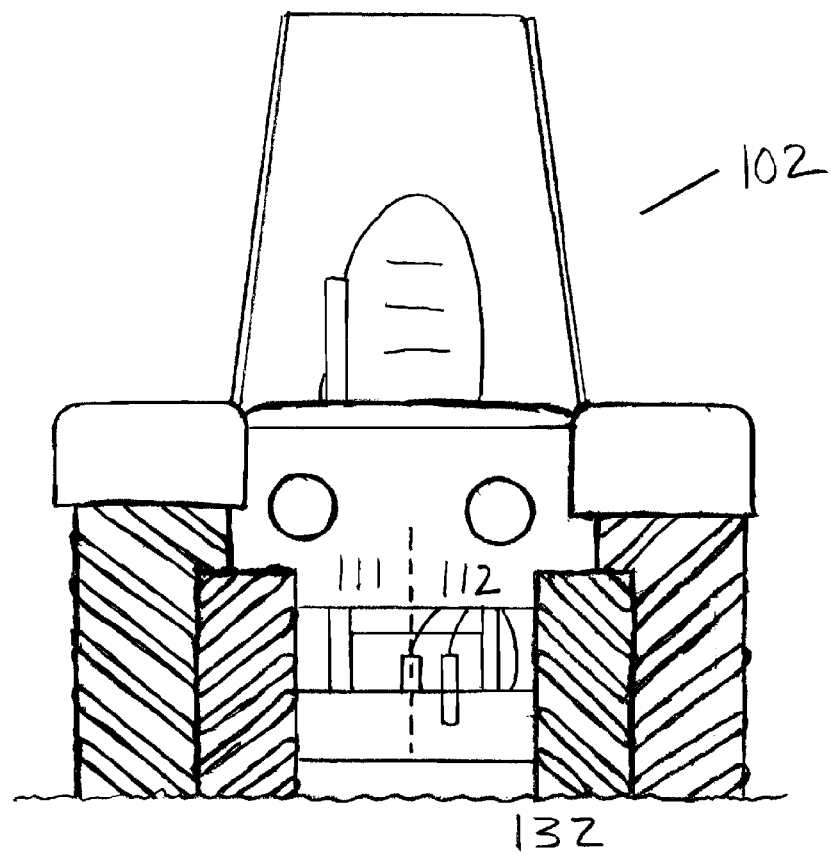
FIG. 1B shows a front view of a tractor with the one embodiment of the apparatus belly mounted thereto. The apparatus is shown in only a very skeletal manner for clarity. The second axis is shown as a vertical line because of the angle it makes with the ground surface when the implement is near, at or below grade (ground level).
Figure 2:
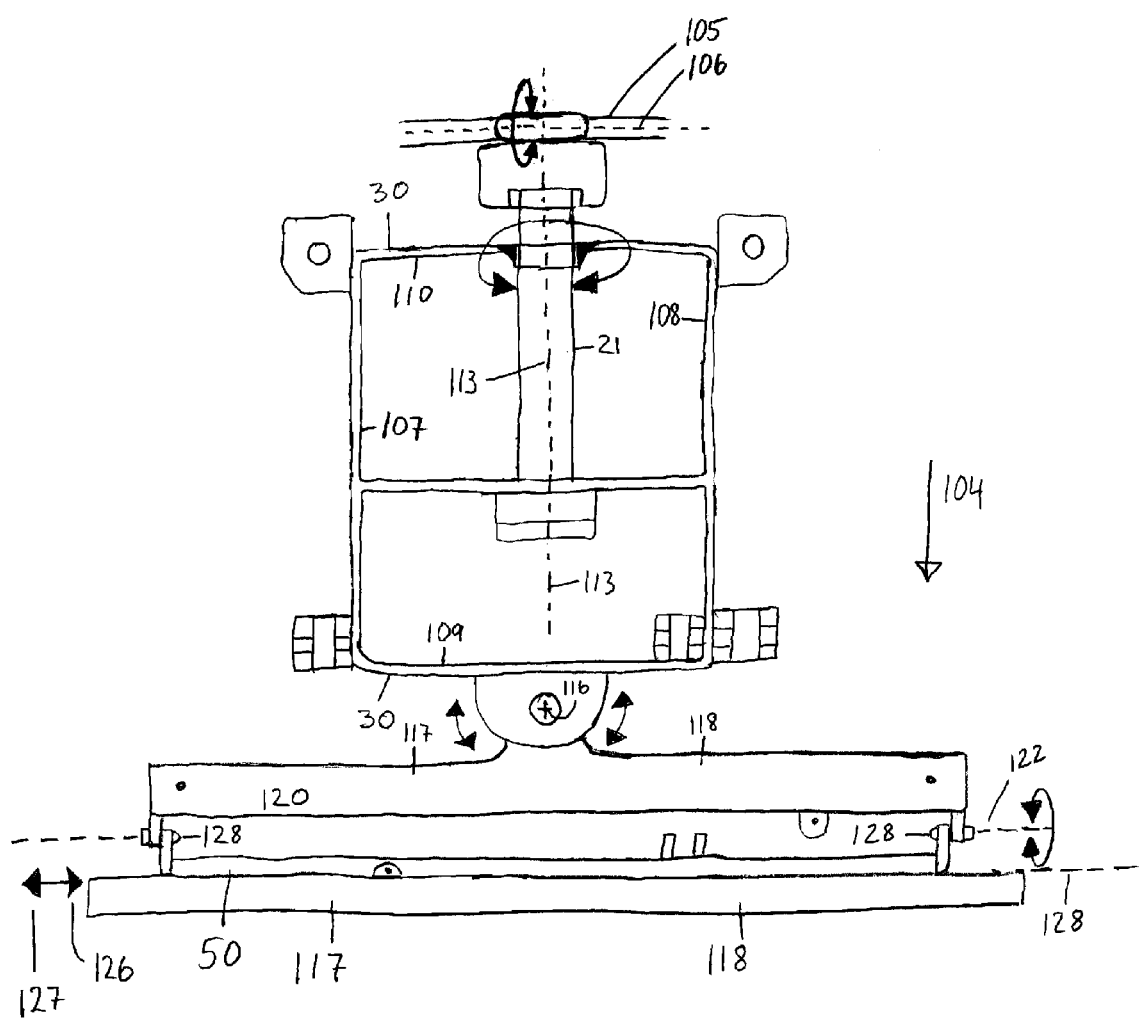
FIG. 2 shows a sketch of the movable frame and various attached components, in addition to axes of rotation/translation, in at least one embodiment of the inventive technology. Actuators are deleted for clarity reasons.
Figure 3:
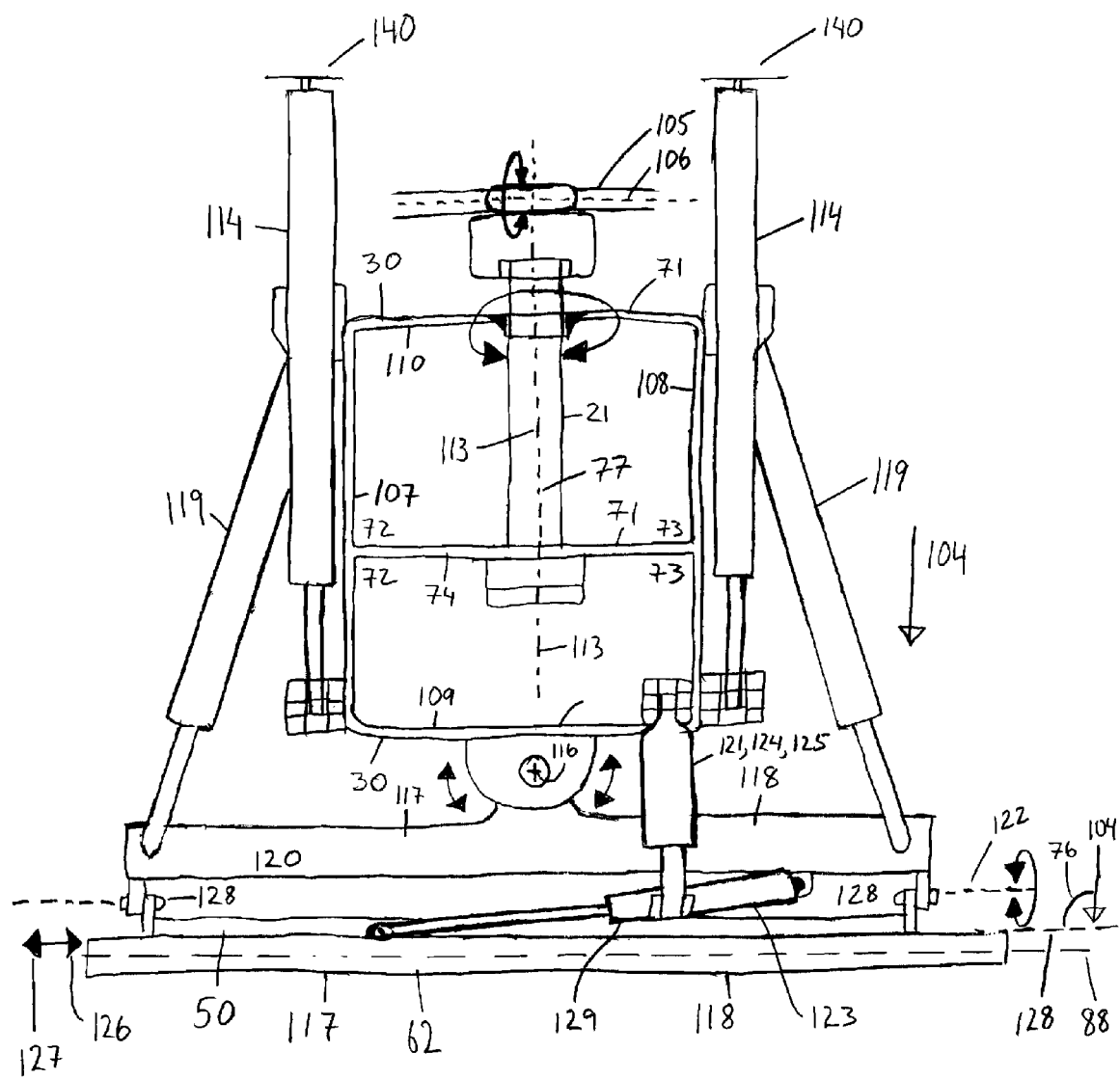
FIG. 3 shows a sketch of the movable frame and various attached components, in addition to axes of rotation/translation and actuators, in at least one embodiment of the inventive technology.
Figure 4A:
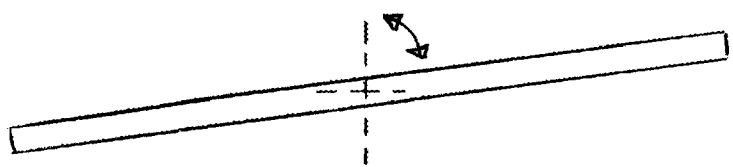
FIG. 4A shows a schematic of a view from above the implement (a grading blade in this instance), showing in particular the fore/aft angling motion degree of freedom afforded by embodiments of the inventive technology.
Figure 4B:
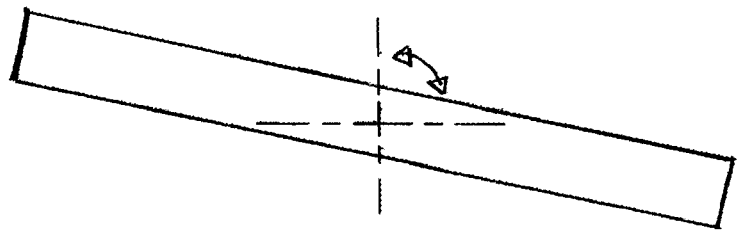
FIG. 4B shows a schematic of a view from in front of (or behind) the implement (a grading blade in this instance), showing in particular the tilting motion degree of freedom afforded by embodiments of the inventive technology.
Figure 4C:
FIG. 4C shows a schematic of a view from the side of the implement (a grading blade in this instance), showing in particular the raising/lowering motion degree of freedom afforded by embodiments of the inventive technology. As this degree of freedom is, in preferred embodiments, accomplished via rotation about the first axis, it is most accurately be described as a rotational raising/lowering motion degree of freedom.
Figure 4D:
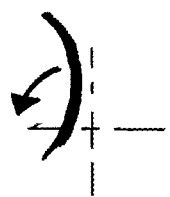
FIG. 4D shows a schematic of a view from the side of the implement (a grading blade in this instance), showing in particular enhanced pitch motion degree of freedom of the implement afforded by embodiments of the inventive technology.
Figure 4E:
FIG. 4e shows a schematic of a view from in front of (or behind) the implement (a grading blade in this instance), showing in particular the right/left sliding motion degree of freedom afforded by embodiments of the inventive technology.
Figure 5:
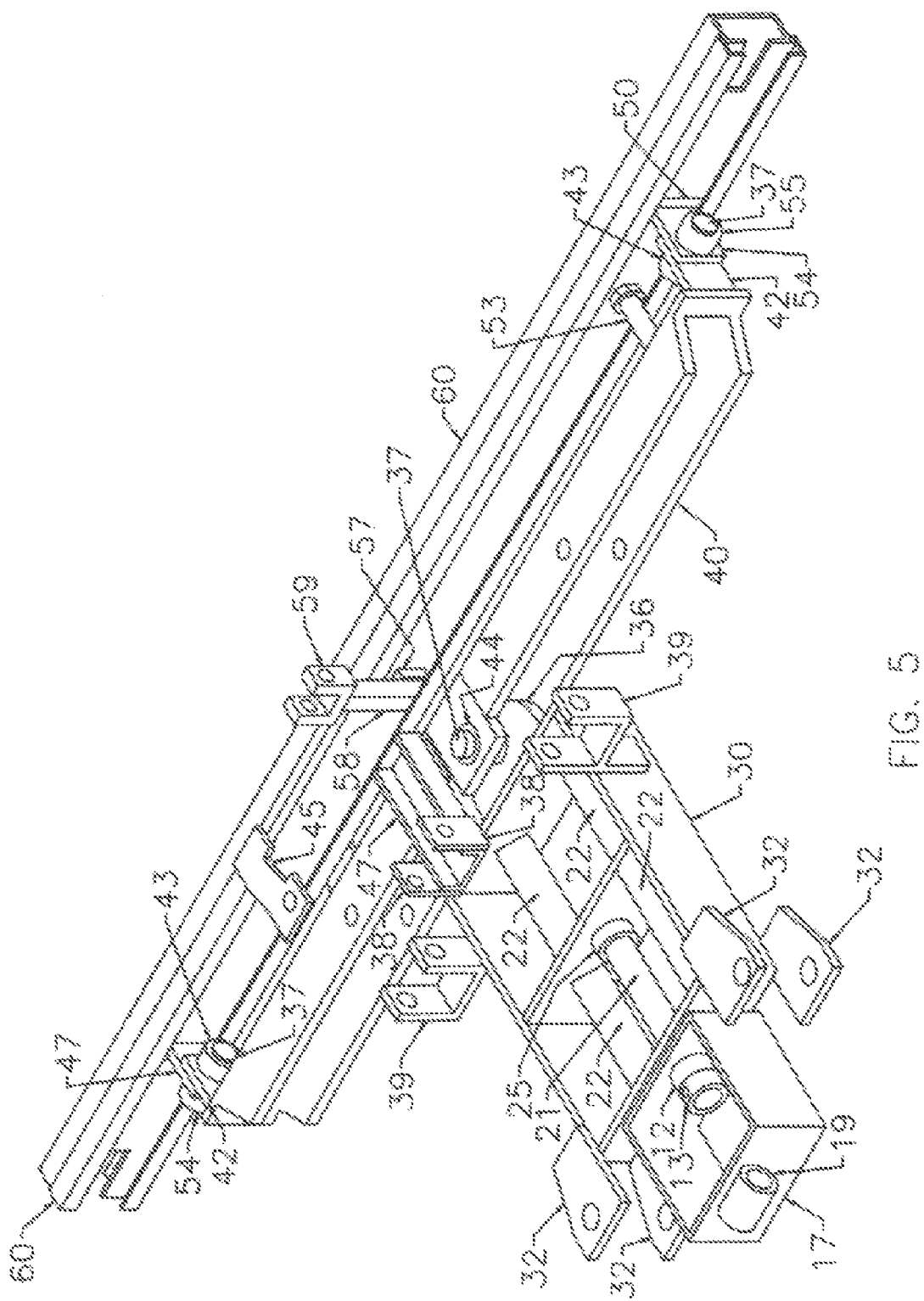
FIG. 5 shows a perspective view (from the rear looking forward, at an angle) of an embodiment of the inventive apparatus.
Figure 6:
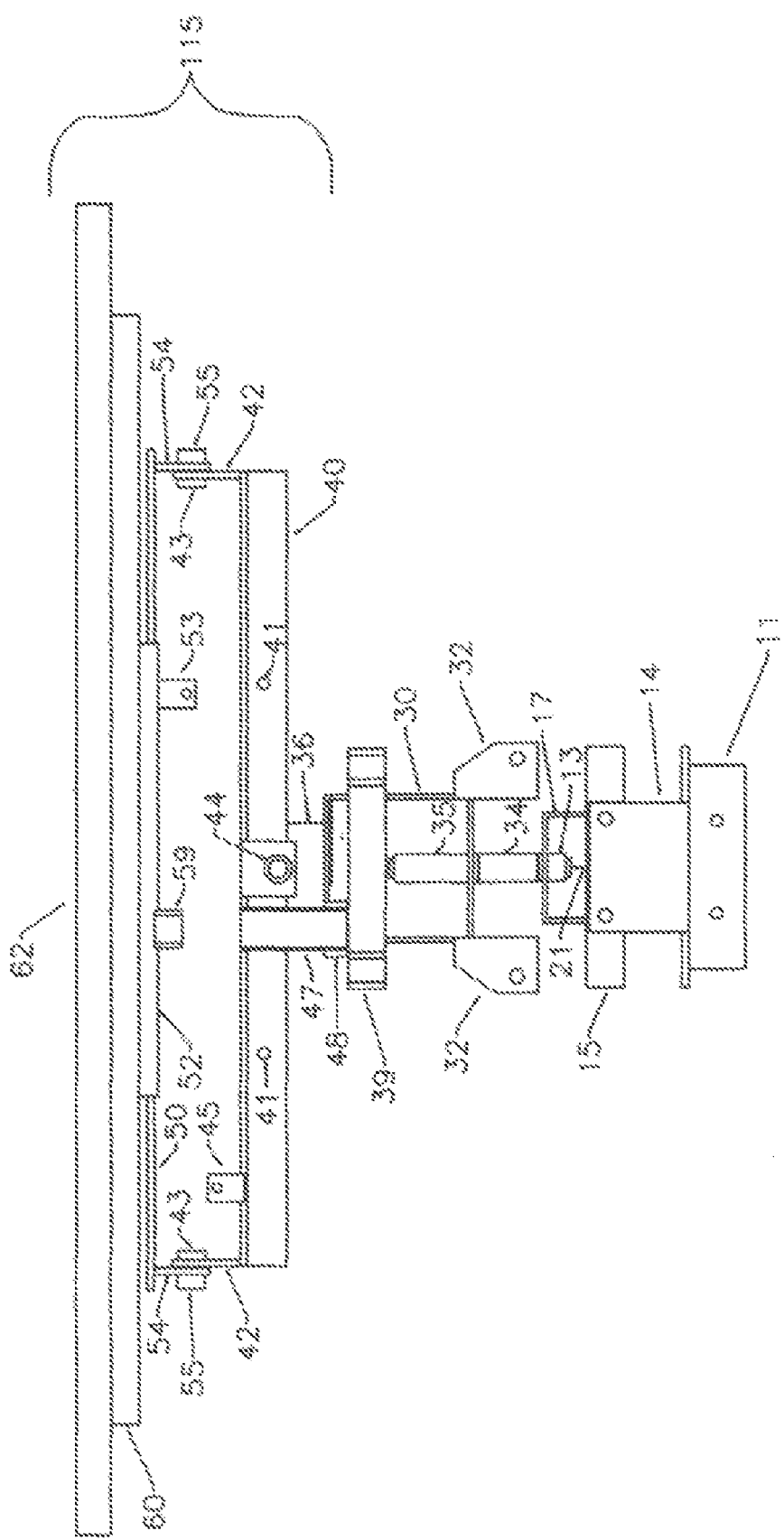
FIG. 6 is a top view looking down view of an embodiment of the inventive apparatus, illustrating the implement mounting structure with the grading attachment installed.
Figure 7:
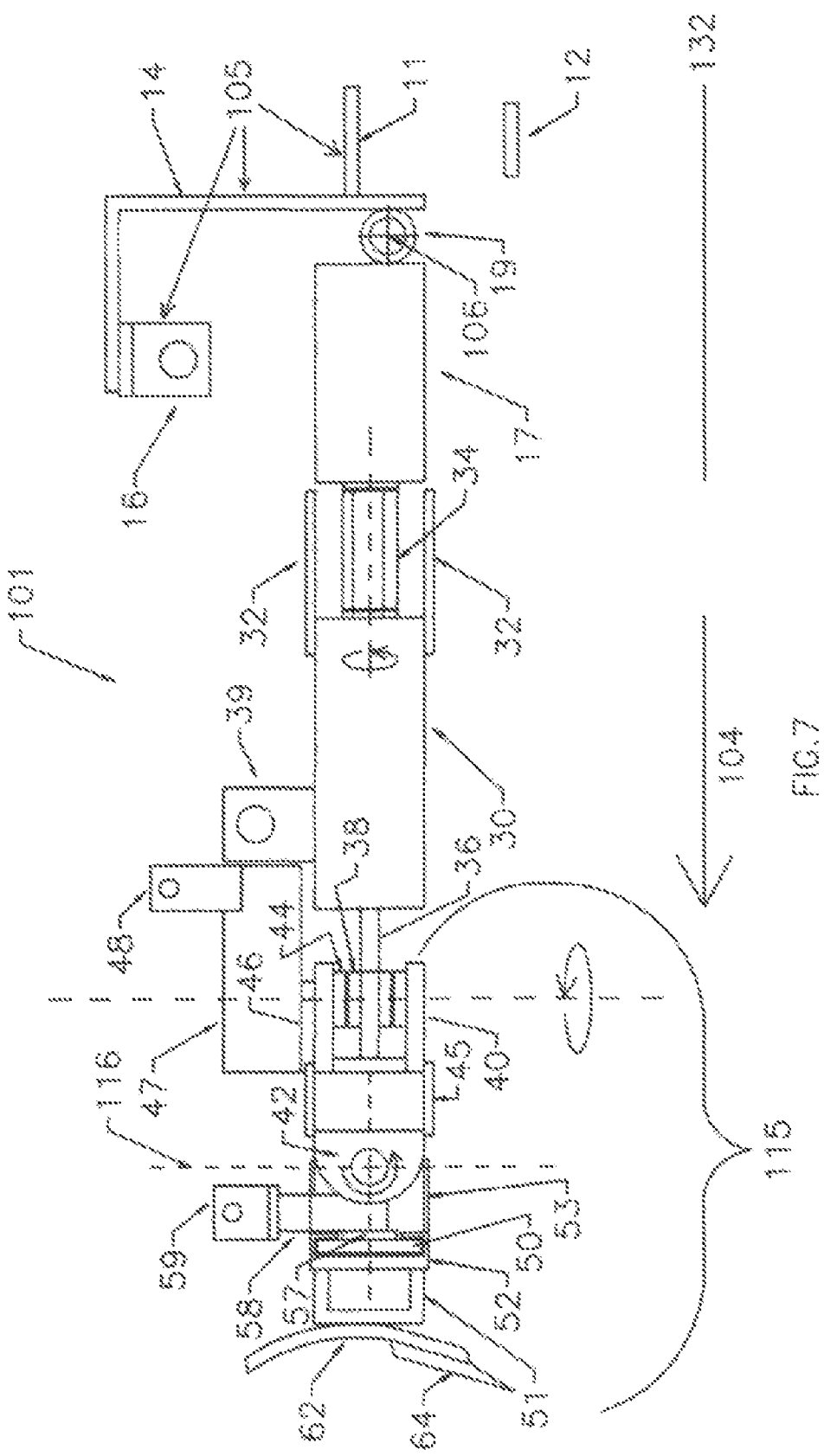
FIG. 7 is a detailed side view of an embodiment of the inventive apparatus, illustrating the implement mounting structure with the grading attachment installed.
Figure 8:
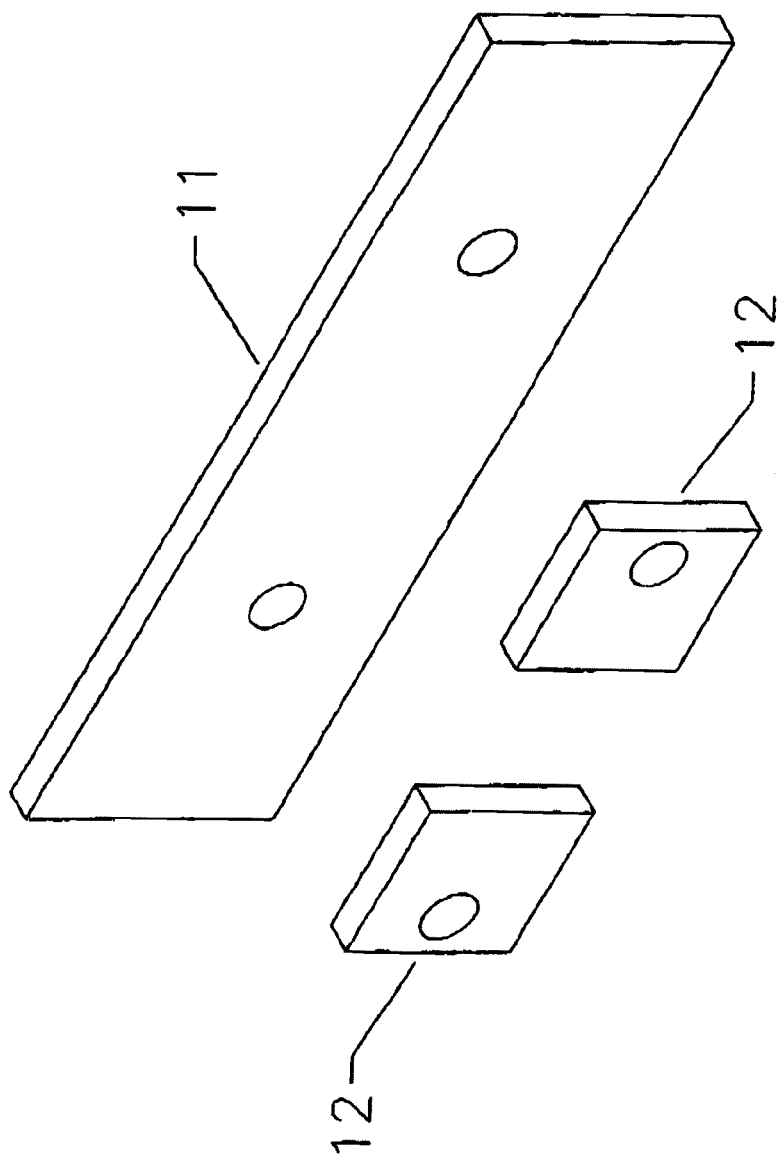
FIG. 8 is a perspective view of the rear support bracket and the two mounting plates that may be attached (e.g. welded, etc.) to the tractors rear hitch assembly in an embodiment of the inventive apparatus. As such, it is merely one of many examples of components that may be used to accomplish the necessary connection.
Figure 9:
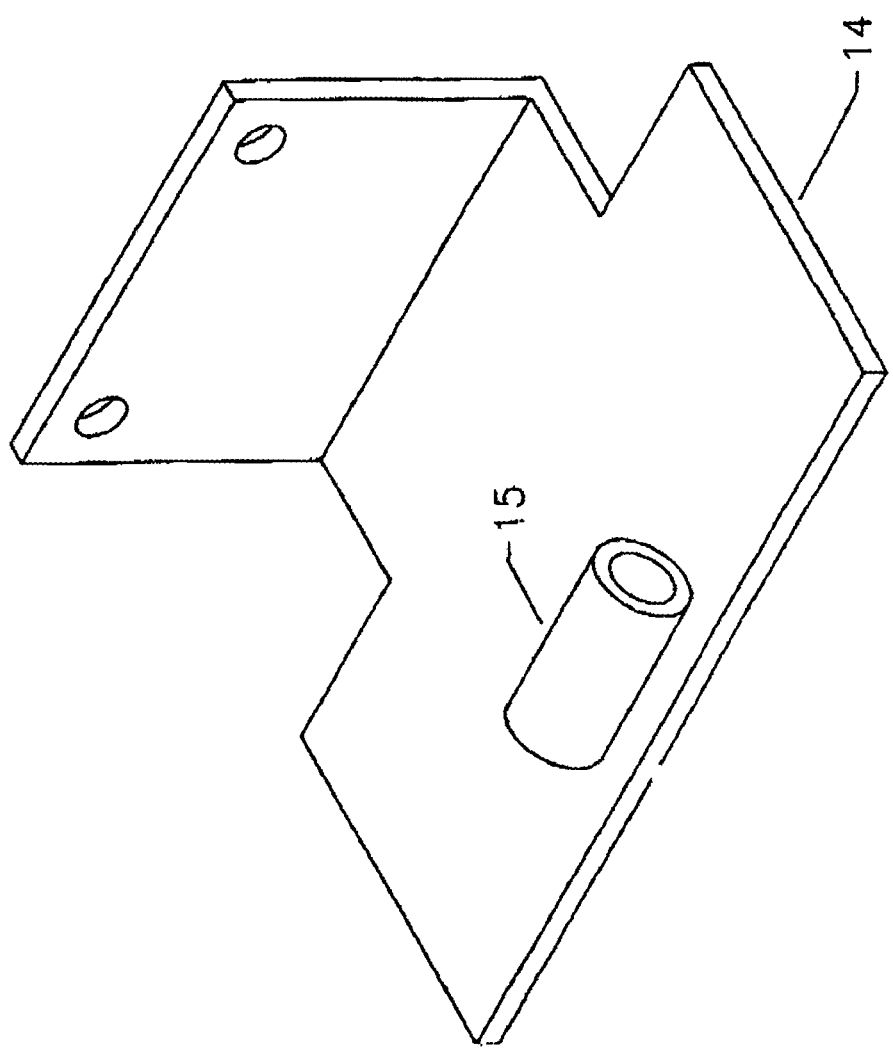
FIG. 9 is a detailed view of the tractor mounting bracket that is attached to the tractor, in an embodiment of the inventive apparatus. Also shown is the rear bushing used to mount the lift/lower bracket in an embodiment of the inventive apparatus.
Figure 10:
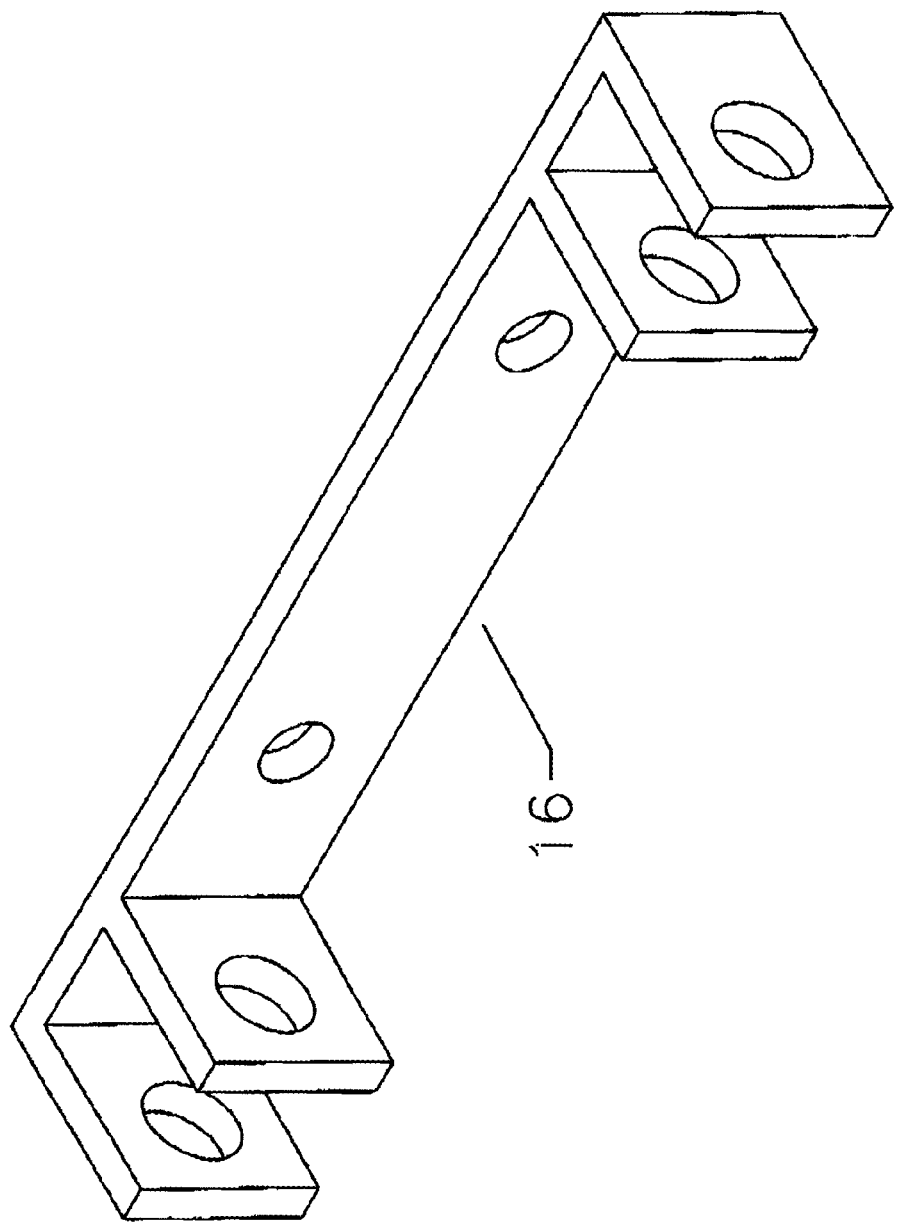
FIG. 10 is a detailed view of the upper tilt actuator mounting bracket, in an embodiment of the inventive apparatus.
Figure 11:
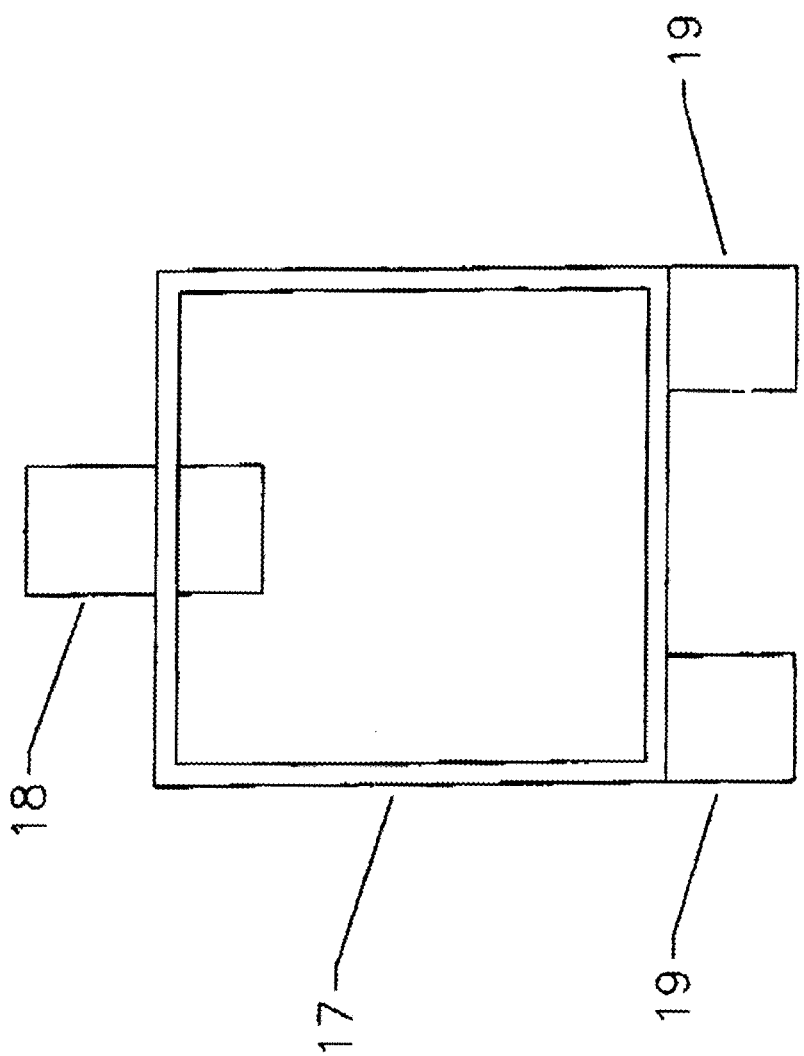
FIG. 11 is a detailed view of the lift/lower tilt bracket showing the front lift/lower bushings and the rear tilt bushing in an embodiment of the inventive apparatus.
Figure 12:
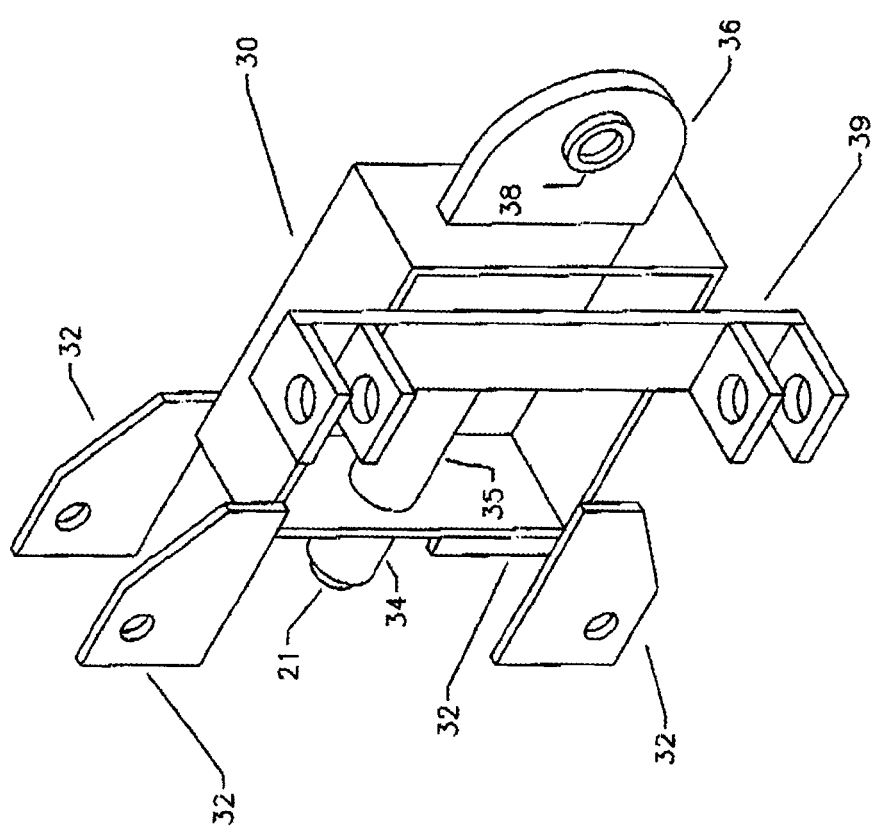
FIG. 12 is a perspective view looking down at the movable frame (e.g., tilt and fore/aft assembly) showing a partial view of shaft that runs through the it (e.g., through the rear tilt bracket, the sizing bushing and the front tilt bracket and the front tilt bushing) in an embodiment of the inventive apparatus.

As mentioned earlier, the present invention includes a variety of aspects, which may be combined in different ways. The following descriptions are provided to list elements and describe some of the embodiments of the present invention. These elements are listed with initial embodiments, however it should be understood that they may be combined in any manner and in any number to create additional embodiments. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

In certain embodiments, a hydraulically operated, belly-mounted implement attachment for tractors (compact utility tractors, as but one example). Facile and fast attachment and detachment, absence of interference with other attachments, simplicity of operation, responsiveness, strength, and lower weight as compared with certain prior art apparatus are just a few of the many advantages offered by the inventive technology described herein, in embodiments.

At least one embodiment of the inventive technology may be described as a vehicle supported implement control apparatus 101 for connection with a vehicle 102 having a vehicle chassis 103 (a supporting frame) and movable in a vehicle forward travel direction 104. The apparatus may comprise a mounting component 105 that is stationary relative to the vehicle chassis (it may be considered part of the vehicle); and a movable frame 30 pivotally connectable with the mounting component so that the movable frame is rotatable relative to the mounting component about a first axis 106 (which, in at least one embodiment, is horizontal) that is orthogonal to a vehicle forward travel direction; the movable frame may have right, left, front and back movable frame portions 107, 108, 109, 110.

The apparatus may further include a shaft 21 passing through at least a part of the movable frame and defining a second axis 113 that is transverse to the first axis and about which the frame is rotatable; a first pair of actuators 114, each having two ends, each connected at one end with the right and left vehicle portion, respectively, and at an opposite end with the right and left movable frame portion, respectively; an implement assembly 115 (which may include an implement such as a grading blade (62), as but one example) pivotally connected with the movable frame so that the implement assembly is rotatable relative to a third axis 116 that is substantially orthogonal to the first and the second axes, the implement assembly having right and left implement assembly portions 117, 118; and a second pair of actuators 119, each having two ends, each connected at one end with the right and left movable frame portion, respectively, and at an opposite end with the right and left implement assembly portions, respectively. The right vehicle portion 111 may be on a right side of the second axis and the left vehicle portion 112 on a left side of the second axis.

In preferred embodiments, the vehicle supported implement is a tractor supported implement; it may, more particularly, be a tractor belly mounted implement (such as a grading blade). The apparatus may more generally be used whenever it is desired to control the position of a first element (e.g., an implement) in relation to a second element (e.g., a vehicle of any sort) to which it is attached. In at least one embodiment, the first axis is an implement raise and lower axis; the second axis is an implement roll axis; and/or the third axis is an implement yaw axis. Of course, such terms can be understood upon analogy to their meanings in an aeronautical context (from a perspective above the vehicle carrying the implement, where forward is a forward vehicle travel direction). In particular embodiments, the movable frame is movable only relative to the first and second axes (e.g., an implement raise and lower axis and an implement yaw axis).

In at least one embodiment, the implement assembly (which, of course, may include an implement) may also comprise a right left implement movement controller 123 that translationally moves the implement in left and right directions 126, 127 along a translation axis 128. In preferred embodiments, operation of the right left implement movement controller does not effect change in spatial position of the movable frame. In embodiments with a right left implement movement controller (and even in some without), the implement assembly may be movable in at least four degrees of freedom (perhaps at least two degrees of freedom relative to the movable frame). The apparatus may further include an enhanced implement pitch controller connected with the implement assembly, perhaps enabling movement of the implement assembly in five degrees of freedom (perhaps three degrees of freedom relative to the movable frame).

In certain embodiments, the right left implement movement controller is a right left implement movement actuator 129 (e.g., a hydraulic cylinder, or a lever). In at least one embodiment, the right left implement movement controller has two ends and is connected with the implement at a first of the two right left implement movement controller ends. The implement assembly may further include a non-implement portion 120, and the other of the two right left implement movement controller ends may be connected with the non-implement portion of the implement assembly. In certain preferred embodiments, the right left implement movement controller slidingly moves the implement relative to the movable frame along the translation axis. The implement assembly may further comprise a slide carriage 50 with which the implement is slidingly engaged.

At least one embodiment of the inventive technology may further include an enhanced implement pitch controller 121 connected with the implement assembly. Preferably, operation of the enhanced implement pitch controller does not effect change in spatial position of the movable frame. Also, the enhanced implement pitch controller may rotatably move the implement about an enhanced pitch axis 122 that is more proximal the implement than is the first axis and that is orthogonal to the third axis. In certain embodiments the enhanced pitch axis is forward of a rearward most portion of the implement assembly; the enhanced pitch axis may be parallel with the first axis. In such, and other embodiments, the implement assembly may be movable in at least 4 degrees of freedom; it may be movable in at least two degrees of freedom relative to the movable frame. In such, and other, embodiments, the implement assembly may comprise a right left implement movement controller 123 that translationally moves the implement in left and right directions. The implement assembly may include a mechanism 128 enabling rotation of the implement about an enhanced pitch axis. The term enhanced, as used here, refers to pitch motion that is defined by a smaller radius of curvature than motion about an implement raise and lower axis (which also may be viewed as a type of pitch motion). As such, low resolution pitch control may be achieved up manipulation of the implement assembly about the implement raise and lower axis, and higher resolution control may be achieved upon manipulation of the implement assembly about the enhanced pitch axis.

In embodiments with an enhanced implement pitch controller, it may include an enhanced implement pitch actuator 124 (e.g., a hydraulic cylinder 125, or a lever). In particular embodiments, the enhanced implement pitch controller has two ends and is connected with an implement of the implement assembly at one of the two enhanced implement pitch controller ends. The other of the two enhanced implement pitch controller ends may be connected with the movable frame.

In certain embodiments, the first pair of actuators is operable to effect rotatable movement of the movable frame about the first axis and the second axis, and the second pair of actuators is operable to effect rotatable movement of the implement assembly about the third axis. The second pair of actuators may be operable to effect rotatable movement of the implement assembly about the third axis without moving the movable frame. Further, motion about the first axis may effect a change in spatial position of the second pair of actuators, and motion about the second axis may effect a change in spatial position of the first pair of actuators. In certain embodiments, as may be clear, the implement assembly may be movable relative to the movable frame.

Additionally, with regard to connections in certain embodiments, two ends (e.g., rearward ends) of the first pair of actuators may be connected with the right and left vehicle portions and may be connected above the first axis. Further, two ends (e.g., rearward ends) of the second pair of actuators may be connected with the right and left movable frame portion and may each be connected closer to the second axis than are the ends of the second pair of actuators that are connected with the right and left implement assembly portions.

In certain embodiments, the apparatus may further include a manually operable hydraulic control system 131 to which the actuators are responsive. Actuators may instead be pneumatic, e.g., or indeed may be any type of powered (often, but not necessarily, to achieve a necessary fluidic pressure) system. Actuators may be activated by manually operable handles 133 of the hydraulic control system. Instead, in a non-powered control system, the actuators may include manually operated levers 134 and position locks 135, in addition, perhaps, to springs that bias implement position relative to an axis in a certain direction, whether translational or rotational.

In certain embodiments, the apparatus may further include a bushing 34 established around at least a portion of the shaft. Further, the movable frame may include rear and front support portions, and an intermediate support 71 between the front and back movable frame portions 109, 110. The movable frame may define two polygons 72, which, as but one example, may be two rectangles 73 and/or may share a common side 74.

Particular embodiments of the inventive technology may relate to a method for controlling a position of a vehicle supported implement, and may include the steps of: operating a first pair of actuators to control height of an implement assembly above an underlying ground surface 132 while simultaneously controlling the height of a movable frame to which the implement assembly is attached; operating the first pair of actuators to control a tilt orientation of the implement assembly; operating a second pair of actuators to controllably change an angle the implement makes with a forward travel direction of the vehicle supporting the implement; and operating an enhanced implement pitch controller to control a pitch orientation of an implement of the implement assembly without affecting spatial positions of any of the actuators of the first and second pairs of actuators. Inventive methods may further include the step of working underlying material (e.g., soil, gravel, etc.).

The method may further include the step of operating a right left implement movement controller to translationally move the implement in left and right directions along a translation axis without affecting spatial positions of any of the actuators of the first and second pairs of actuators or of the enhanced implement pitch controller. The step of operating a second pair of actuators to controllably change an angle 76 a longitudinal axis 88 of the implement makes with a forward travel direction of the vehicle supporting the implement may include the step of operating a second pair of actuators to controllably change an angle the implement longitudinal axis makes with a forward travel direction of the vehicle supporting the implement without changing an angle an implement tilt axis 77 makes with the forward travel direction of the vehicle supporting the implement. Further, the step of operating the first pair of actuators to control a tilt orientation of the implement assembly may comprise the step of operating the first pair of actuators to rotate the movable frame about a shaft 21 passing therethrough, which itself may involve the step of operating the first pair of actuators to rotate the movable frame about a shaft having a bushing 34 established therearound.

The step of operating the first pair of actuators to rotate the movable frame may include the step of operating the first pair of actuators to rotate a movable frame that includes front and rear support portions 109, 110 and an intermediate support therebetween. It may include the step of operating the first pair of actuators to rotate a movable frame that defines two polygons 72 (e.g., two rectangles 73, which may or may not share a common side 74).

The steps of operating may each comprise the step of hydraulically operating through manual manipulation of handles 133. The steps of operating may instead each comprise the step of manually operating through levers and position locks (using known lever-type technology). Further, the step of operating a second pair of actuators to controllably change an angle the implement makes with a forward travel direction of the vehicle may include the step of operating a second pair of actuators without affecting spatial positions of any of the first pair of actuators.

It is of note that any part or portion of the apparatus or vehicle to which it may be mounted that it stationary and not movable relative to the vehicle (via the implement control apparatus) may be considered a part of that vehicle, even if the part or portion is added to the vehicle specifically to allow for connection of the implement control apparatus to the vehicle. A mounting component for the apparatus may be a part of the vehicle; where it is stationary relative to vehicle chassis it is considered part of the chassis also.

This description should be viewed as disclosing not only a connectible apparatus (i.e., an apparatus connectible to vehicle), but also a connected apparatus. Indeed, all functionally descriptive terms (attachable, connectible, etc.) should be considered as also providing support for the referenced parts and components as if the function were achieved (attached and connected, e.g.).

The term "each connected at one end to the right and left vehicle portion, respectively" implies that one of the referenced components is connected with the right vehicle portion and the other to the left vehicle portion (similarly worded phrases and limitations have analogous meanings). It is of note that the term right and left, forward and rearward are relative to driver sitting in the vehicle; forward is the forward direction of travel defined by the vehicle itself.

More particularly with regard to certain motions and axes thereof, the term implement axis (roll axis, raise and lower axis) might also be a movable frame axis in that the indicated motion (roll or raise and lower) might also be seen in the movable frame. In certain embodiments, the first pair of actuators can effect motion about the first axis and/or the second axis. Further, it is of note that the term "rotatable" applies even where the referenced component is only partially rotatable about an axis.

It is also of note that even where the enhanced implement pitch controller is connected with the movable frame such that it does not intersect the third axis (which may be a yaw axis), operation of the enhanced implement pitch controller to effect enhanced yaw movement of the implement should not effect a yaw movement of the implement or implement assembly because it will typically not be offset from the third axis enough to do so (more particularly, only a relatively small moment should be generated during operation of the enhanced implement pitch controller). Further, the second pair of actuators (connected with the implement assembly much further out from the third axis than the connection point of the enhanced implement pitch controller) may act to counter such yawing motion (particularly when not being operated to change a yaw position of the implement assembly). Of course, off-axis establishment of the connection of the enhanced implement pitch controller is not a necessary feature of the invention.

Further, and more particularly with regard to certain components, anything that is stationary relative to the implement during all its different types of motion may considered part of the implement. At times, the implement assembly may include only the implement itself. Any actuator may be, in one preferred embodiment, a hydraulic cylinder. Further, certain portions of the shaft can be extended (e.g., the rearward most portion), typically at or during apparatus installation, with the frame adjusted to compensate to allow for extension to provide a customized fit of the apparatus into a particular tractor. This is one manner in which the apparatus may be adjusted to fit onto different sized vehicles (tractors, e.g.). One other manner includes incorporation of an appropriately sized mounting component to situate the rest of the apparatus as desired (e.g., in the "belly" position of a tractor). In certain embodiments, the first pair of actuators is the only pair that has an end that is stationary relative to the vehicle chassis. Further, actuators can be entirely lever controlled (can be position lockable) actuators. Particularly when they are powered (e.g., hydraulically to provide pressurization of a working fluid), they may be extendable (e.g., when an actuator is a hydraulic cylinder). It is also of note that the term right and left vehicle portions are not necessarily defined by the centerline (along the direction of travel) of the vehicle; instead, more particularly, they are defined by the implement roll axis (which may be the second axis).

As follows are specification details regarding at least one embodiment of the inventive technology. Such following description, and the figures referenced therein, show an exemplary manner(s) in which the apparatus may be constructed. Generally, the following presents connection merely embodiments or examples of the many various types of attachment and connection componentry (e.g., brackets) that may be used. Because details regarding all components may be described in the following (and in the figures that it references), referenced parts may be called out using rather specific names. Of course, at times the specific names given may be types of certain more generic names already given to such parts. As follows:

11—Rear support bracket
12—Mounting Plates
13—Locking tilt bushing
14—Tractor Mounting Bracket
15—Rear Lift/Lower Bushing
16—Upper Tilt Lift/Lower Actuator Mount
17—Lift/Lower Tilt Bracket
18—Tilt Bushing
19—Left and Right Front Lift/Lower Bushing
21—Solid shaft (e.g., used for pins in lift lower and tilt assemblies, and perhaps also pivot and pitch assemblies)
30—Movable Frame (e.g., Tilt Lift/Lower and Fore/Aft Assembly)
32—Rear Left and Right Fore/Aft Actuator Brackets
34—Sizing Bushing
35—Front Tilt Bushing
36—Fore/Aft Hitch Bracket
38—Rear Hitch Pivot Bushing
39—Lower Tilt Lift/Lower Actuator Bracket
40—Fore/Aft Pivot Bar
41—Holes for Front Fore/Aft Actuator Pins
42—Left and Right Mount for Pitch Bracket
43—Left and Right Rear Pitch Attachment Bushing
44—Front Hitch Pivot Bushings
45—Rear Side Shift Actuator Mounts
46—Rear Pitch Actuator Mount Spacer
47—Rear Pitch Actuator Mounting Bracket
48—Rear Pitch Actuator Mounts
50—Slide Carriage (e.g., Sliding Side Shift Bracket
51—Attachment Mounting Bracket
53—Front Side Shift Actuator Mount
54—Front Left and Right Side Attachment Mounting Bracket
55—Front Left and Right Side Attachment Mounting Bushing
57—Front Pitch Actuator Mount Spacer
58—Front Pitch Actuator Mount
59—Front Pitch Actuator Mounting Brackets
60—Attachment Mounting Bracket
61—Attachment Mounting Bracket holes
62—Grader Blade
63—Grader Blade Attachment holes
64—Grader Blade Attachment cutting edge Rear Support bracket 11 may be mounted to the Rear Support Mounts which may be welded to the Tractor hitch mount. Bracket 11 may then be welded to the Tractor Mounting Bracket 14. In the embodiment shown Bracket 14 and the upper tilt, lift/lower actuator mount bracket 16 attach to the tractor. Other embodiments could include a plate of steel mounted to the tractor that is then mounted to 14 (as but one example). The rear of the lift/lower assembly 17 may be pivotally attached (e.g., pinned, bolted, etc.) to 12 through bushings 19 and 15. The front of 17 may be pivotally attached (e.g., pin, bolt, etc.) by pin 21 to the tilt lift/lower and fore/aft assembly 30 through the rear tilt bushing 18, sizing bushing 34, and tilt lift/lower and fore/aft assembly stabilizer bushing 35. Rear fore/aft actuator mounting brackets 32 may be attached (e.g., welded, etc.) to 30.

Figure 13:
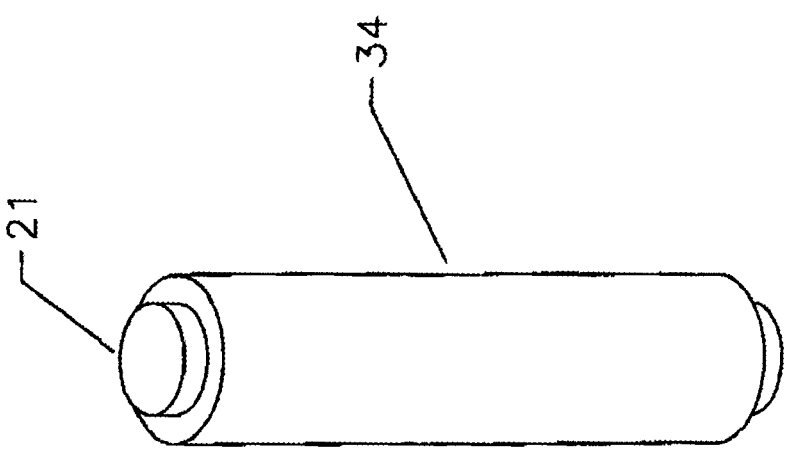
FIG. 13 is a perspective view of the sizing bushing, and a partial view of the shaft that runs through the rear tilt bushing, the sizing bushing, and the front tilt bushing in an embodiment of the inventive apparatus.
Figure 14:
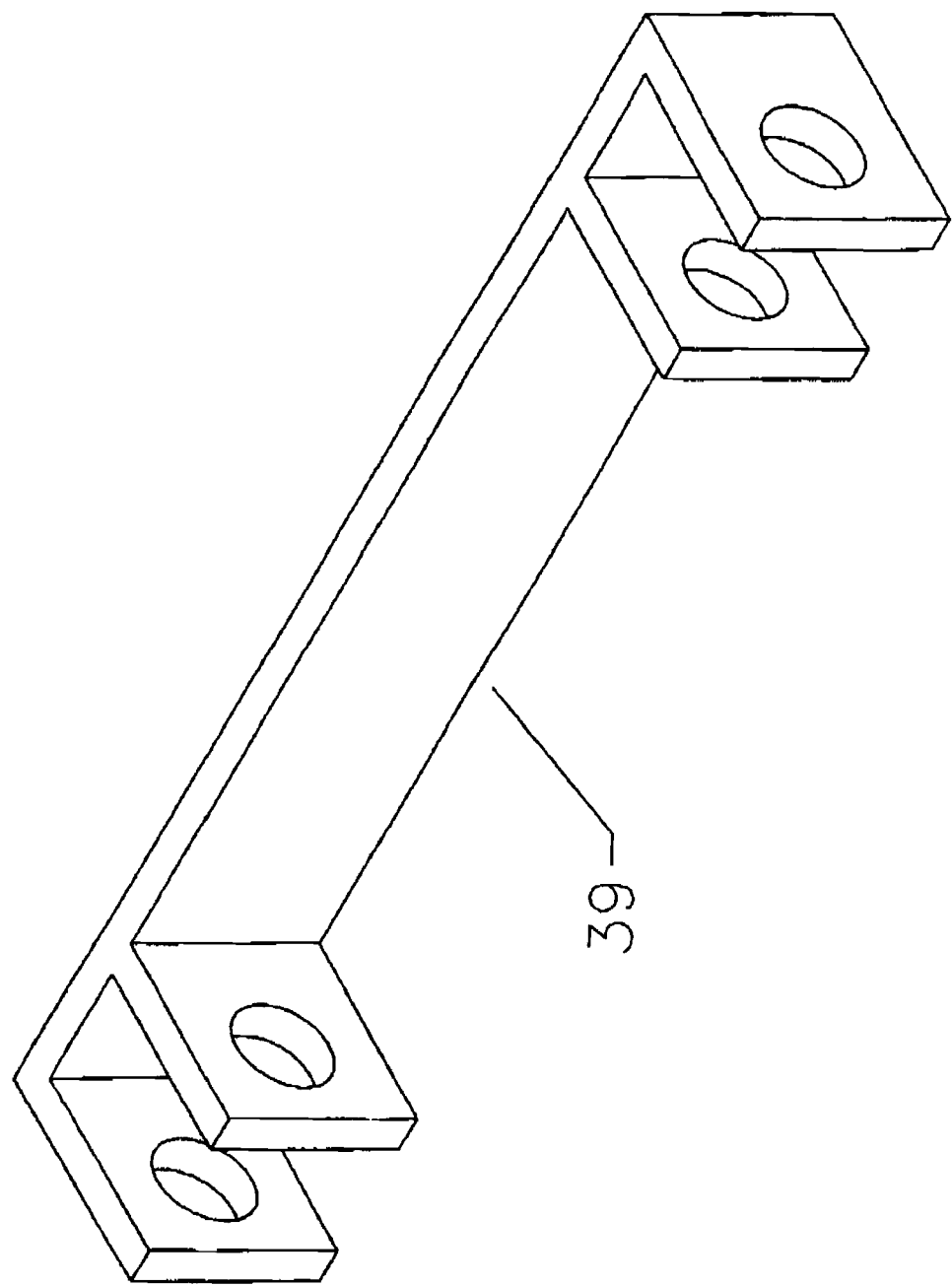
FIG. 14 is a perspective view of lower tilt bracket in an embodiment of the inventive apparatus.
Figure 15:
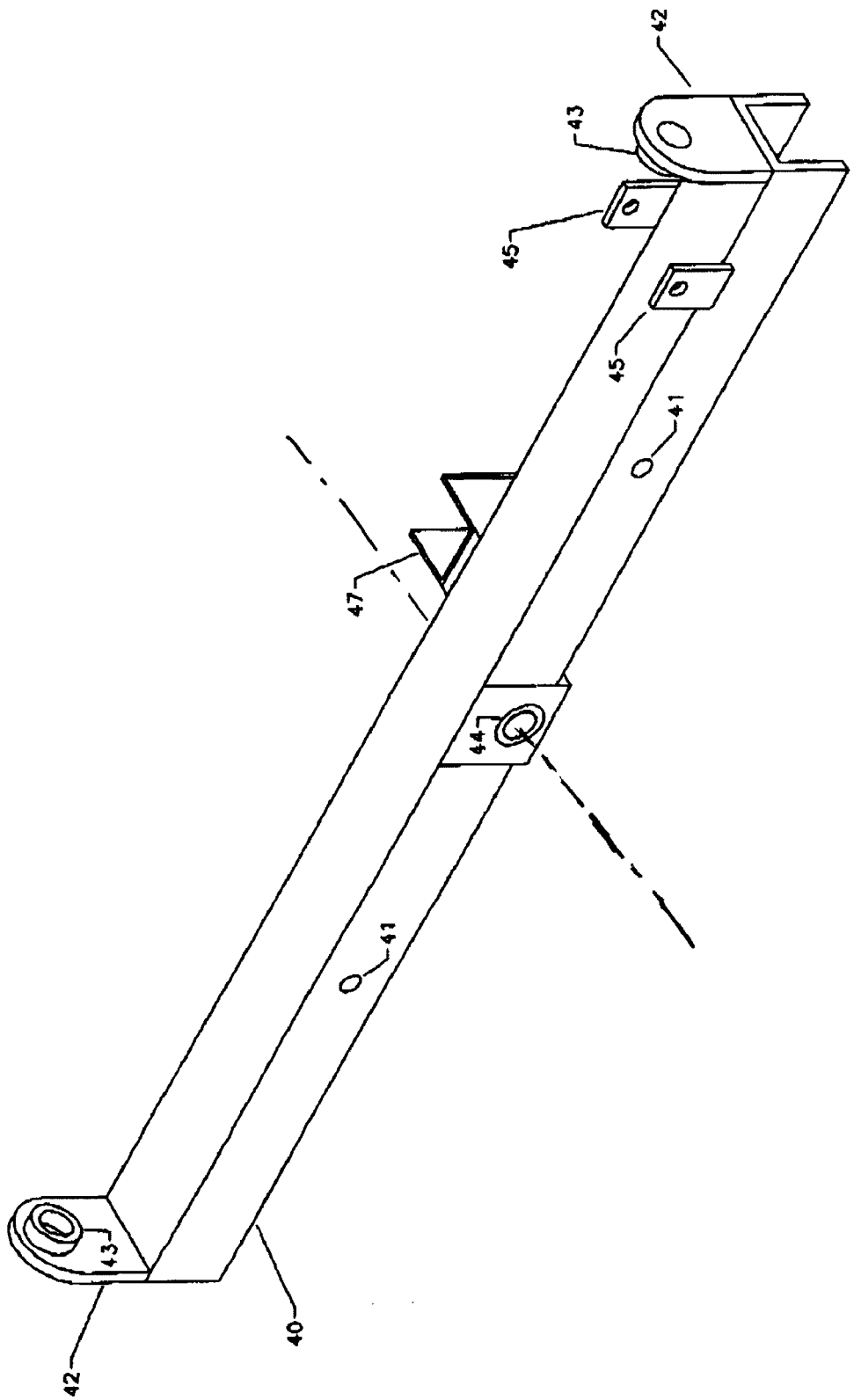
FIG. 15 is an underside perspective view of the front fore/aft hitch mounting bar (for movement of the implement about the yaw axis) showing the mounting holes for the left and right actuators, the rear left and right mounting brackets and bushings for the front pitch and attachment bar, the bushings for the hitch pivot, the mounting brackets for the rear side shift actuator mounts and the rear pitch mount in an embodiment of the inventive apparatus.
Figure 16:
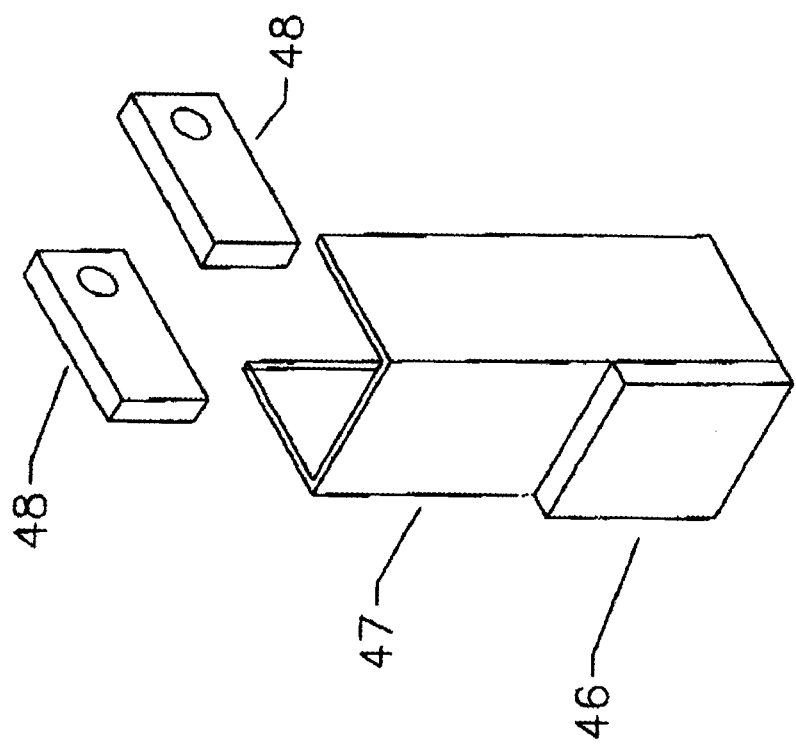
FIG. 16 is an underside perspective view of the rear pitch actuator mount showing the spacer that is attached (e.g., welded, etc.) to front fore/aft hitch mounting bar, and the rear pitch actuator brackets in an embodiment of the inventive apparatus.
Figure 17:
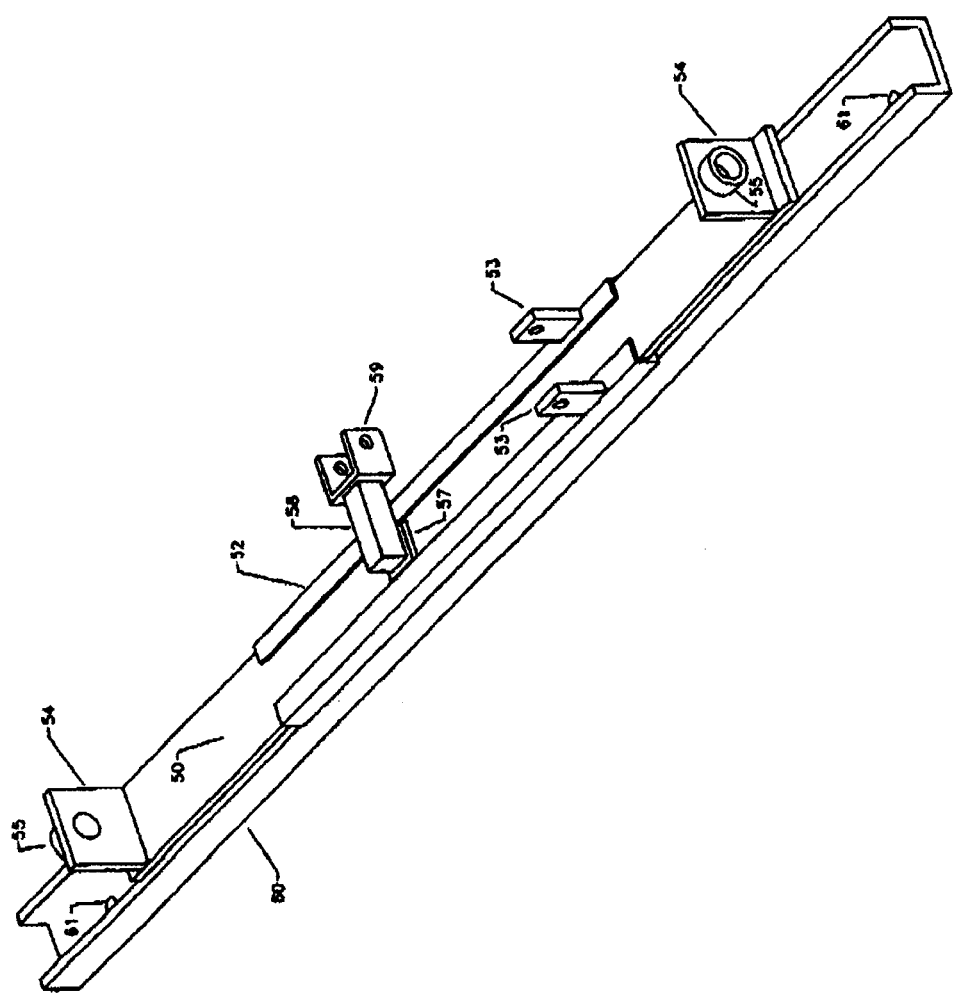
FIG. 17 is a perspective view of the front pitch and attachment bar showing the side shift bar, the sliding side shift bracket, the side shift actuator mounts, the front left and right pitch mounting brackets and bushings, the front pitch actuator mount spacer, the front pitch actuator mount, the front pitch actuator brackets, the attachment bracket joined (e.g., welded, etc.) to the sliding side shift bracket, and the attachment bracket holes in an embodiment of the inventive apparatus.
Figure 18:
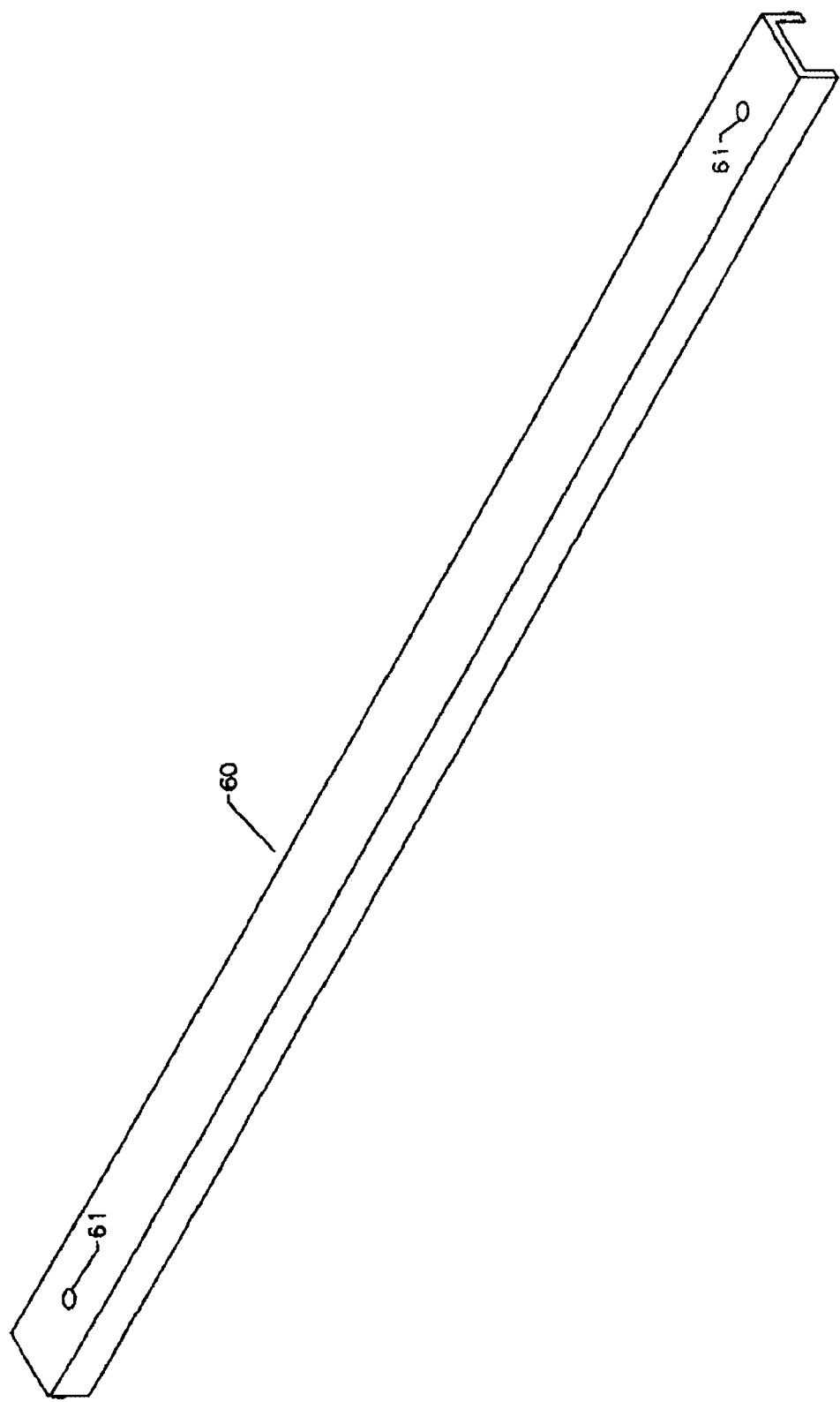
FIG. 18 is a perspective view of the attachment bracket showing the attachment holes used to mount (e.g. threaded bolts and nuts) the various attachments in an embodiment of the inventive apparatus.
Figure 19:
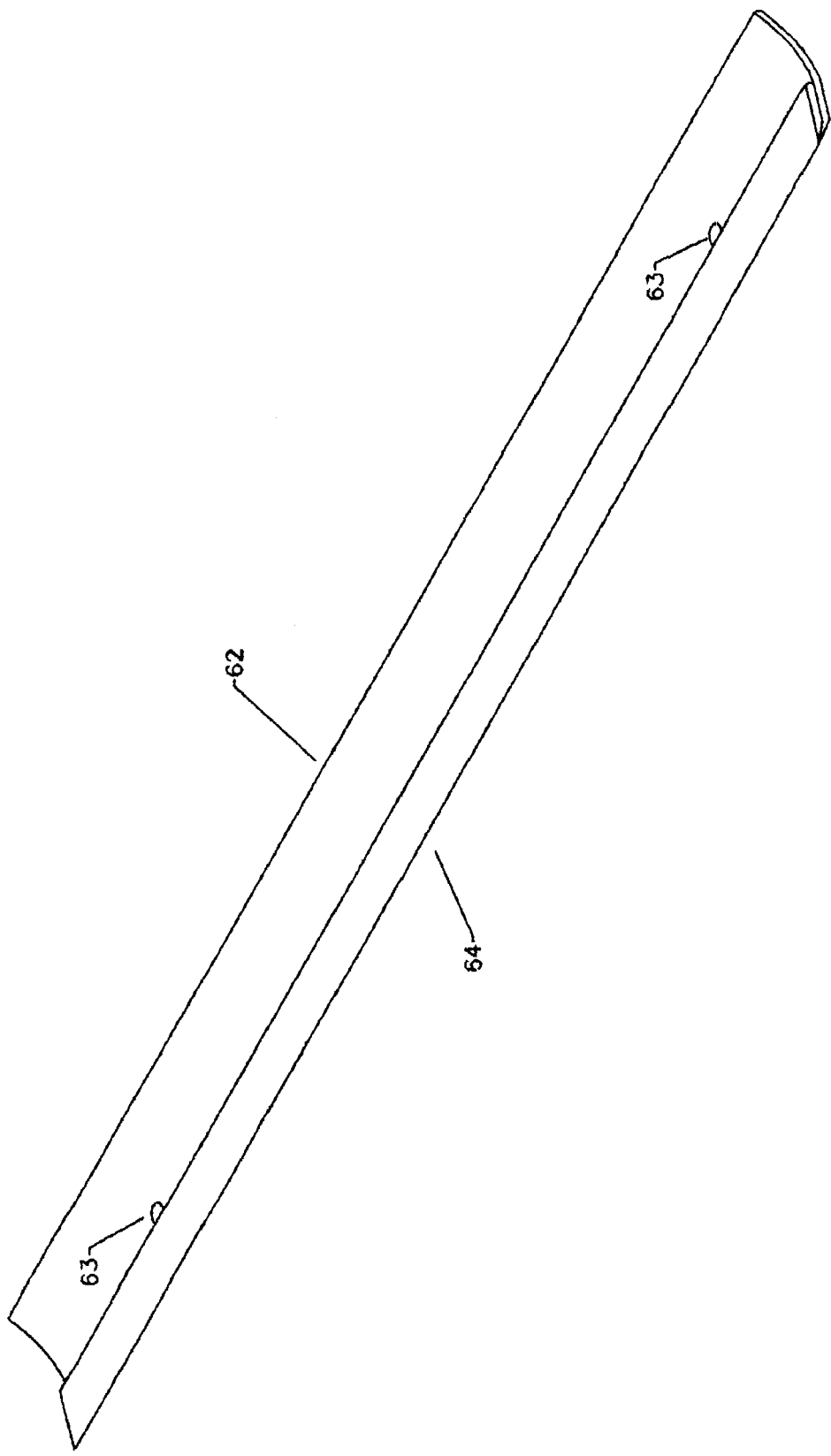
FIG. 19 is a perspective view of the blade attachment embodiment showing the holes that are used to attach (e.g., threaded bolts and nuts, etc.) to the attachment bracket and the cutting edge attached (e.g., welded, threaded bolts and nuts, etc.) in an embodiment of the inventive apparatus.

FIG. 13 shows the sizing bushing 34 and Pin 21. The bushing material used throughout this embodiment may be the same diameter. The lengths may vary depending on the application. Pin 21 may be used as a solid round shaft and lengths may vary depending on the application. The pins used in the Lift/Lower bushings-15&19, the Tilt bushings-18&35, Sizing Bushing 34, the Hitch Pivot Bushings-38&44, and the Attachment Bushings-43&55 are the same diameter as 21.

Lower tilt lift/lower actuator bracket 39 may be centered side to side on the top side of fore/aft assembly 30. Bracket 39 may be attached (e.g., welded, etc.) to 30 at the highest point of the actuators travel, assuring clearance of all components on the underside of the tractor (hydraulic lines, brake levers, etc.). Fore/aft hitch 36 may be centered on the front of 30 and attached (e.g. welded, etc.). Fore/aft hitch bushing 38 may be centered horizontally and positioned near the front edge of 36.

Fore/aft mounting bar 40 may be attached (e.g. pinned, etc.) to 30 through 38. Top and bottom fore/aft mounting bar bushings 44 may be centered left to right on 40 and attached near the rear top and bottom of 40.

Holes 41 may be used for mounting the fore/aft actuators on the left and right side of 40. Holes 41 may be spaced at a distance from the center hole of 40 such that the fore/aft movement of 40 and/or attachments will not hit any of the tires on the tractor when the attachment is moved back and forth.

Left and Right Mounts for Rear Pitch Bracket 42 may be long enough such that when attached to the Front Pitch Bracket 50 there is room for the side shift actuator to be mounted between 40 and 50. Left and Right Rear Attachment Pitch Bushings 43 may be attached (e.g., welded, etc.) to the Left and Right Pitch Mounts 42.

Front Pitch Bracket 50 may have Side Shift Bracket 52 slid on before attaching (e.g., welded, etc.) the mounting brackets 54. Brackets 54 may have Bushings 43 attached (e.g., welded, etc.). The two mounting brackets 54 may then be attached (e.g., welded, etc) near the each end of 50. Attachment Mounting Bracket 60 may be centered on 52 and may be attached (e.g., welded, etc.) to 52.

In certain embodiments, a grader blade attachment 62 is shown with holes 63. Through holes 63 fasteners (e.g. Threaded Bolt and Nut, etc.) may be used to attach to 51. All the attachments may be mounted in this manner, in particular embodiments.

Figure 20:
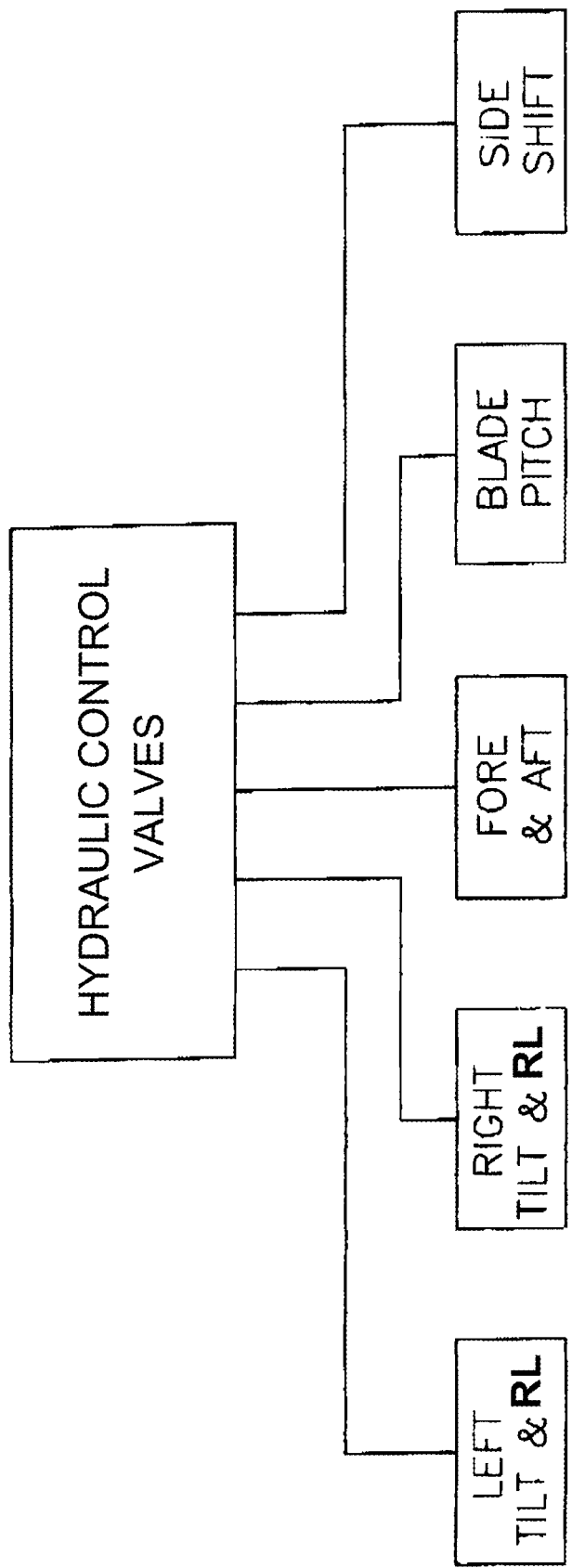
FIG. 20 shows a flow chart of the hydraulics used in particular embodiments. It is note that the valves, in this embodiment, are not each dedicated to each degree of freedom (e.g., two valves, the left tilt and left raise lower (RL) valve and the right tilt and RL valve are used to control the raise/lower degree of freedom). It is also not the case that each valve is necessarily dedicated to a single actuator (e.g., the fore and aft valve may control two actuators because when in particular embodiments, when one actuator of the pair retracts, the other extends by an equal amount). It is of note that pure raising or lowering is accomplished by retracting the two raise/lower actuators and extending them, respectively, by equal amounts. Tilt can be accomplished by differentially retracting and/or contracting them (one actuator may even be left in its pre-tilting motion configuration). Of course, motions can be superposed by simultaneous operation of more than one valve. Typically, each handle controls one valve.
Figure 21:
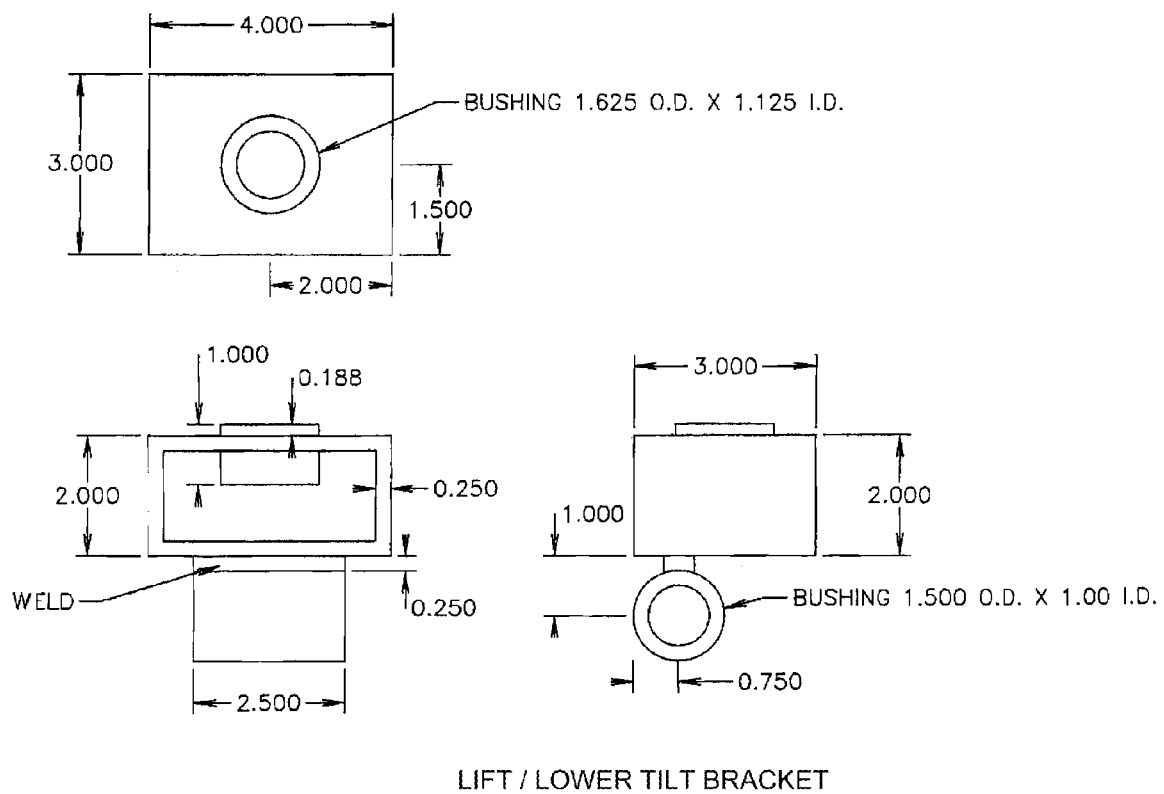
FIG. 21 shows a lift/lower (also known as raise lower) tilt bracket as may be found in an embodiment of the inventive technology. Dimensions are merely exemplary, and certainly not limiting in any fashion (this applies to all disclosure of dimensions in this description, including drawings).
Figure 22:
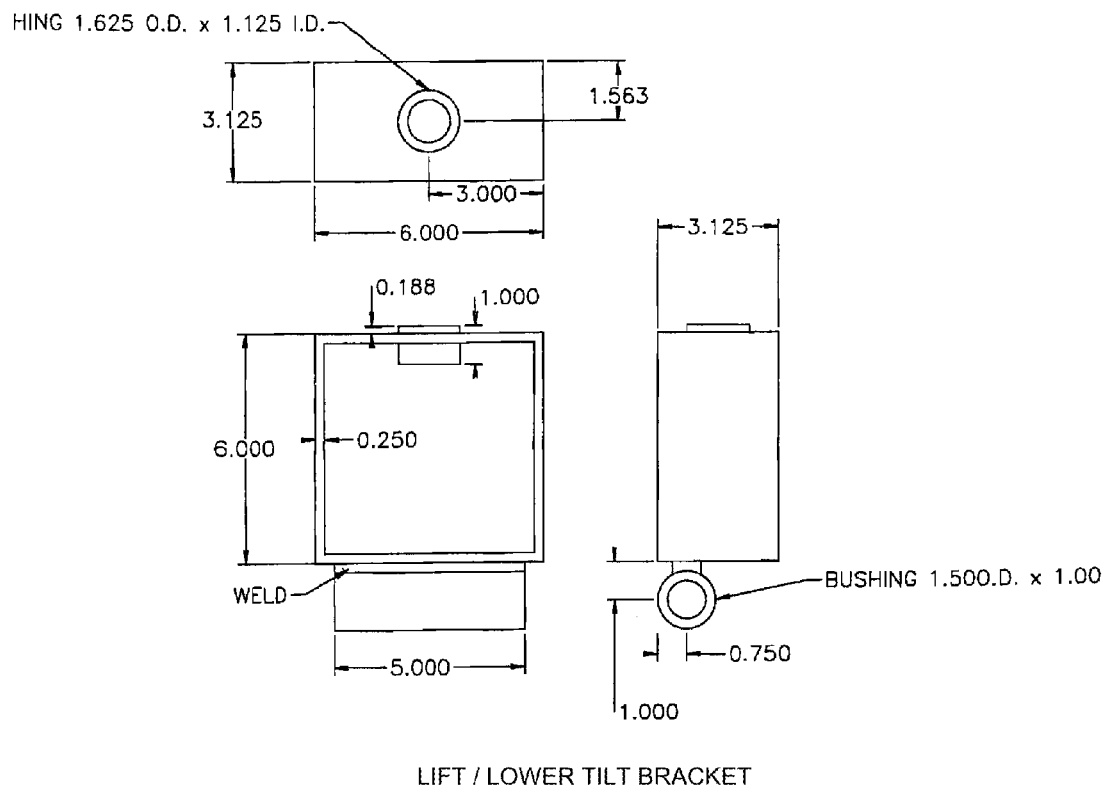
FIG. 22 shows a lift/lower (also known as raise lower) tilt bracket as may be found in an embodiment of the inventive technology.
Figure 23B:
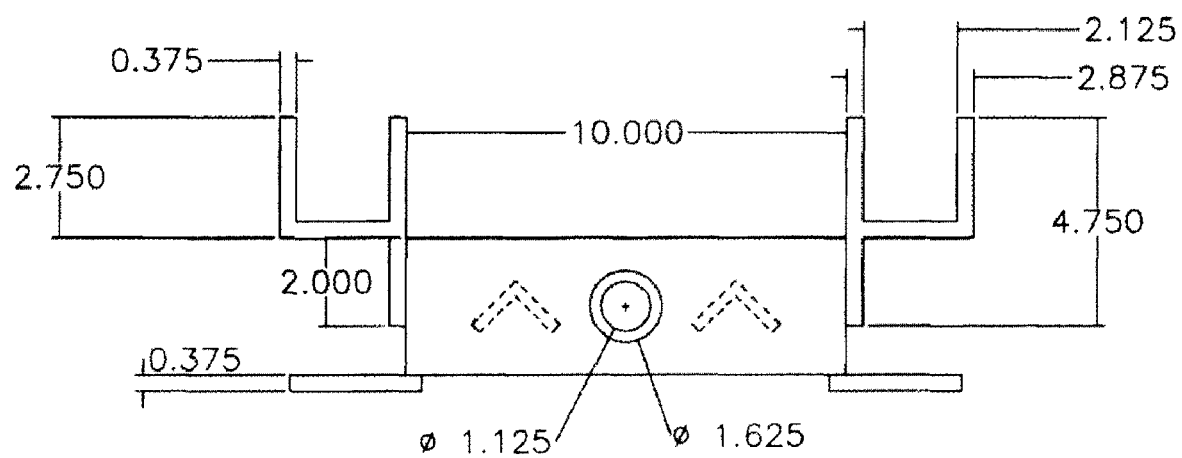
Figure 23C:
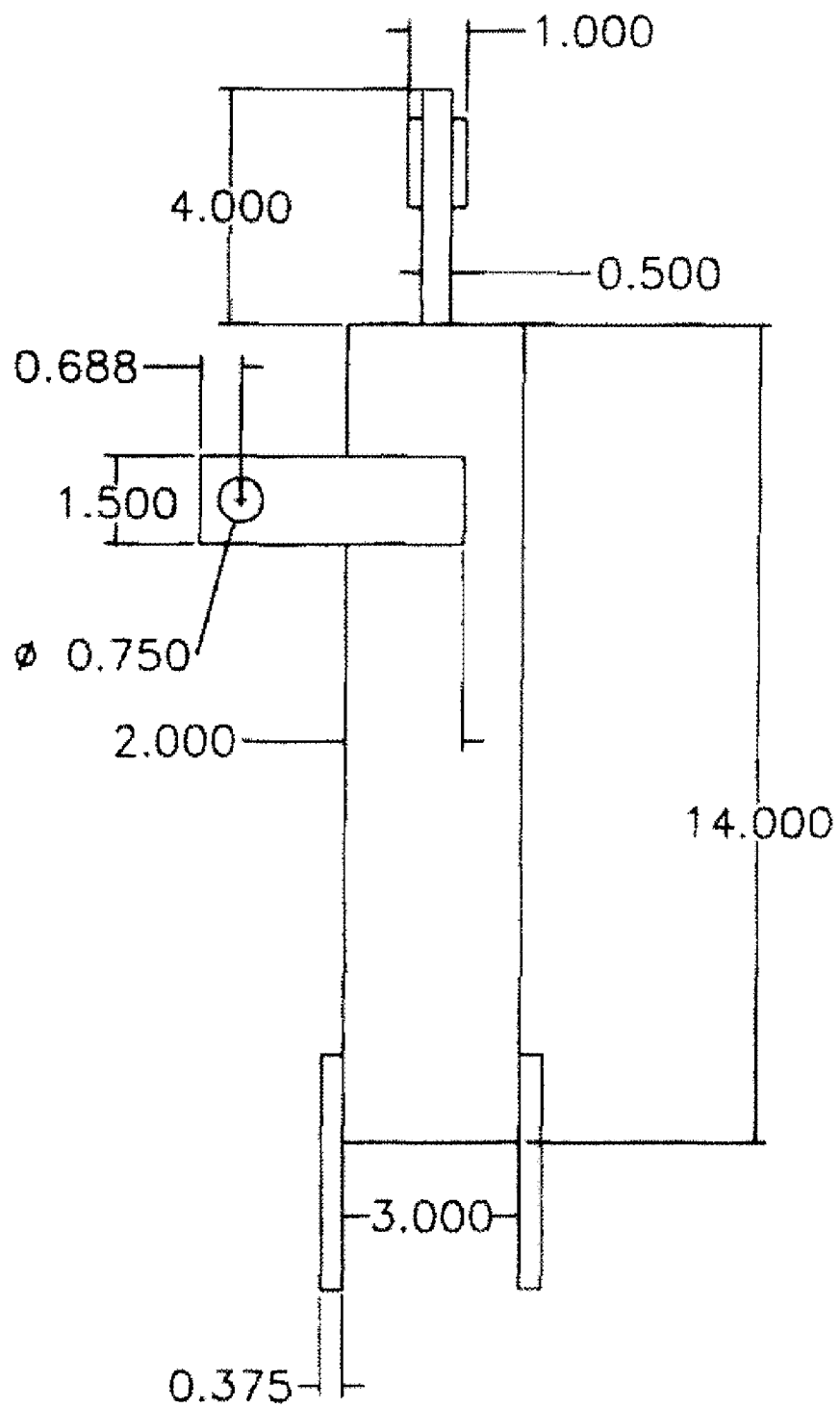
Figure 24B:
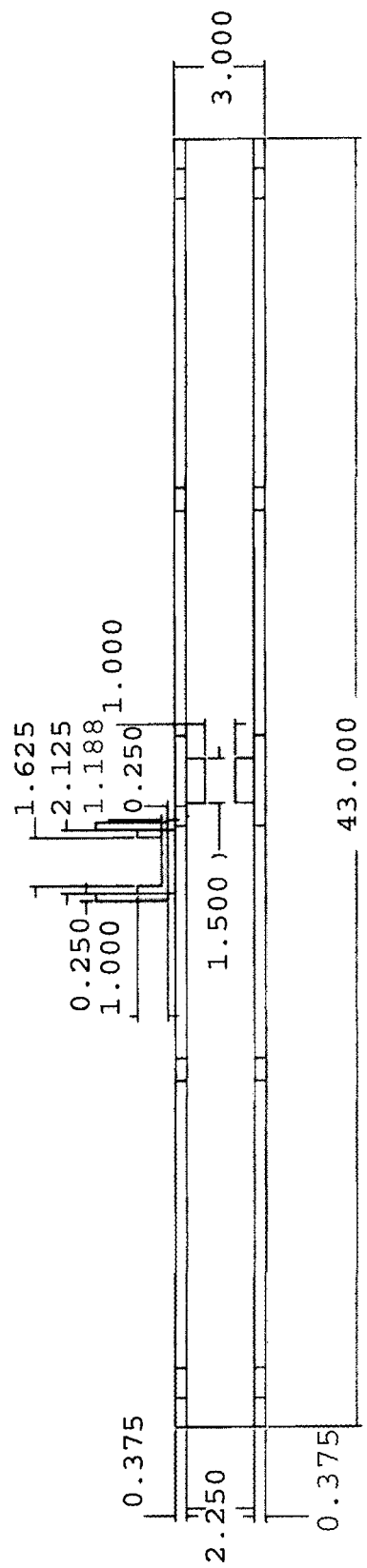
Figure 24C:
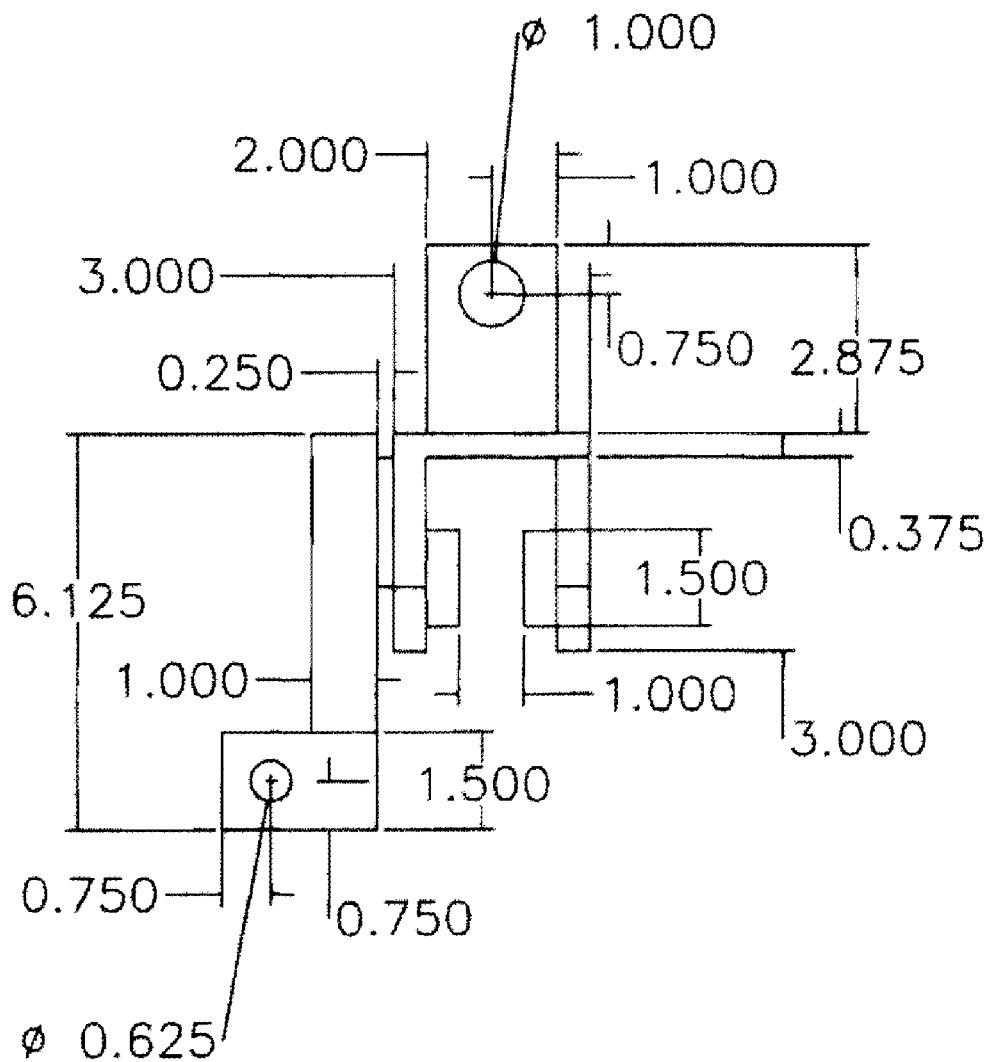
Figure 25C:
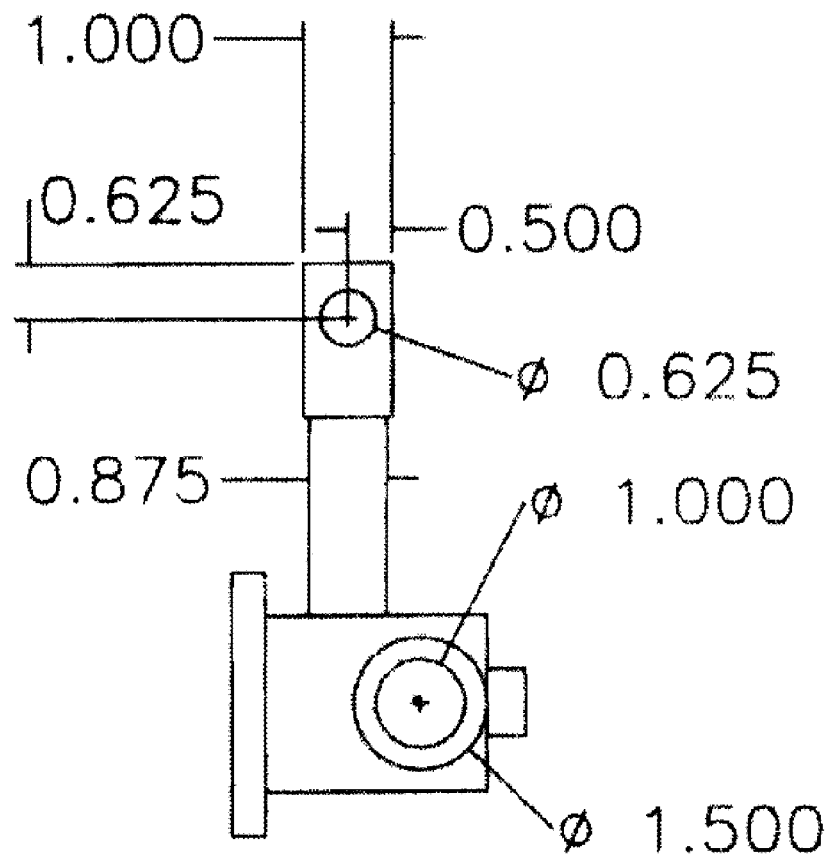
Figure 26A:
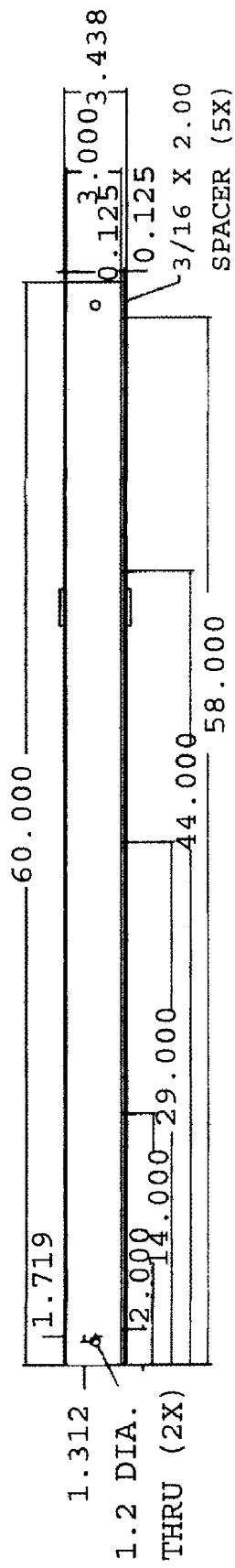
Figure 26E:
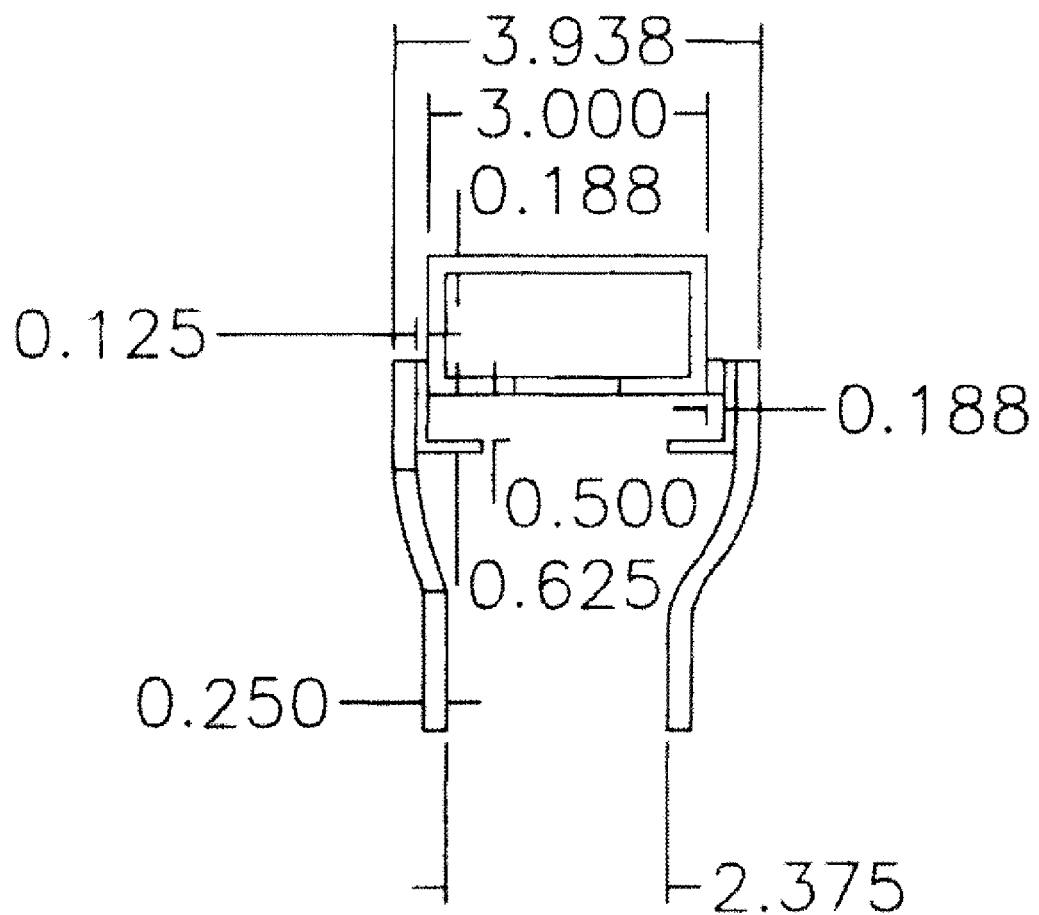
Figure 27A:
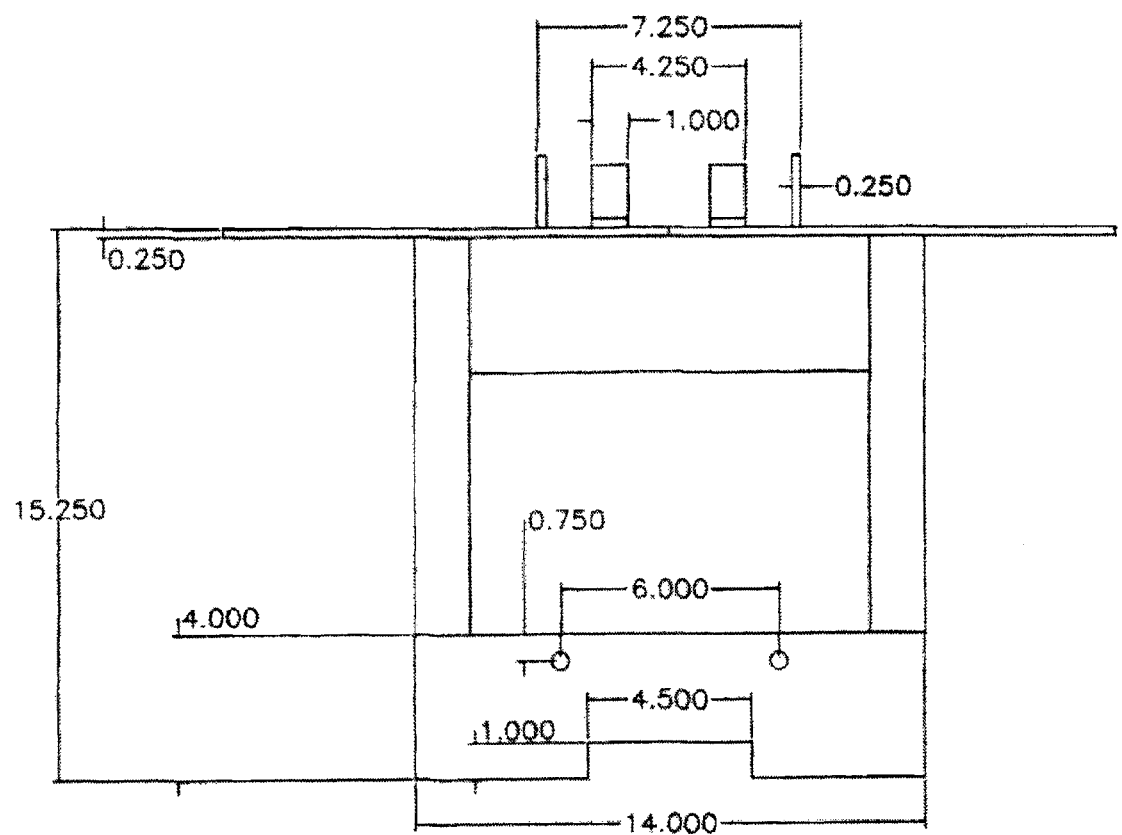
FIGS. 27A-C show mounting componentry as may be found in an embodiment of the inventive technology.
Figure 27B:
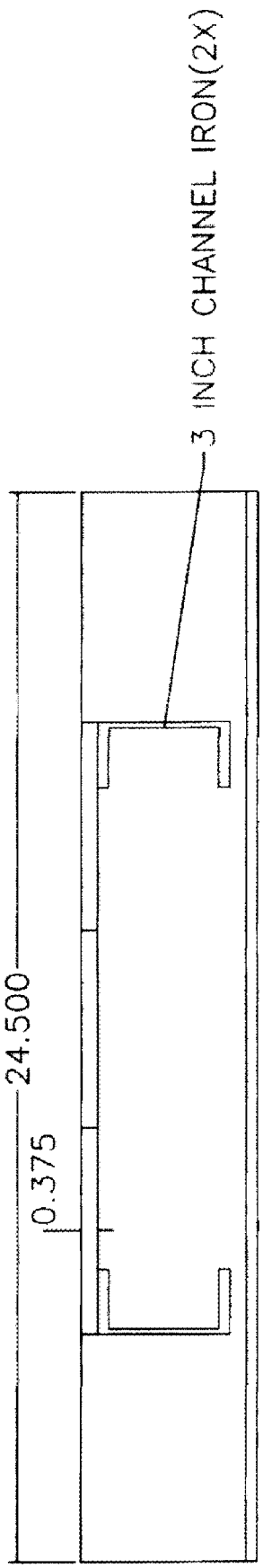
Figure 27C:
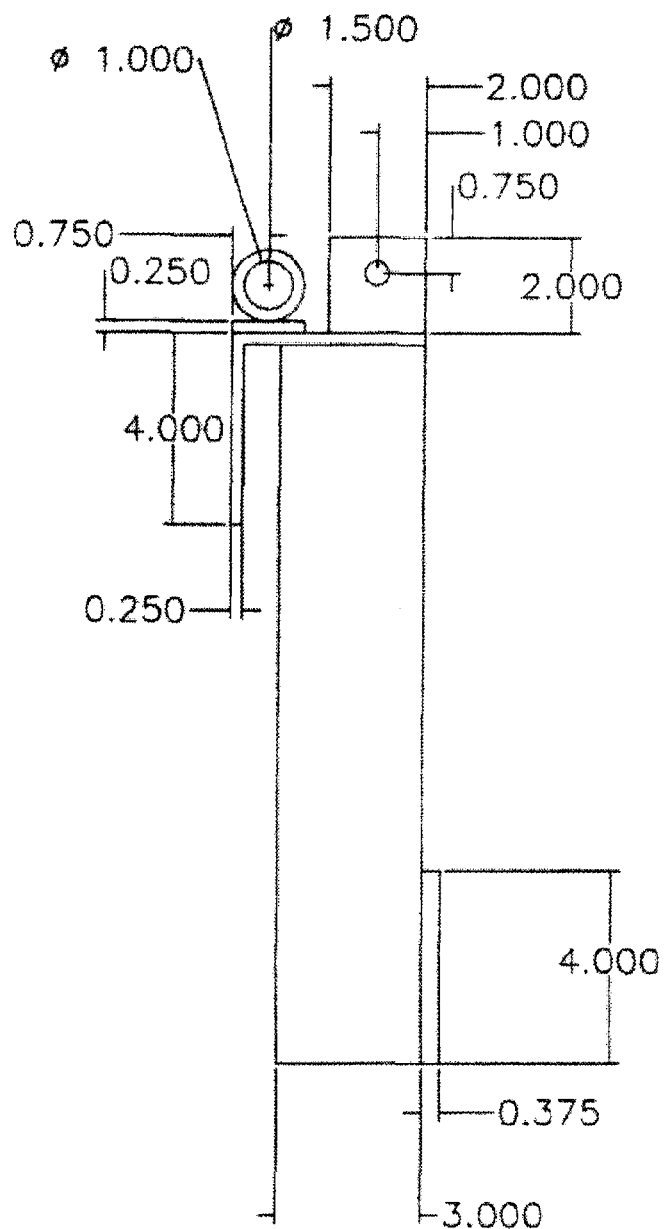

In this embodiment of the invention double acting hydraulic actuators were used. FIG. 20 is a flow chart showing 5 different controls of the actuators used. A 5 spool double acting control valve was used to control the various operations of the unit.

This embodiment has no grease zerks shown. In other embodiments grease zerks could be added at all pivot points.

Operation in One Embodiment: The control valve levers may be set up as follows, from left to right: The first lever controls the left tilt/lift lower actuator movement of the attachment up and down. The second lever controls right tilt/lift lower actuator movement up and down. The third lever controls fore/aft movement of the attachment. The fourth lever controls the attachment pitch movement forward and backward. The fifth lever controls the side to side movement of the attachment.

Instructions of how to operate a grader may be found on the internet at any of the many earthmoving operations web site. Reference is also made to military field manual 5-434.

Particularly with regard to operation of an attached aerator, all that is required is to lower the attachment and apply some down pressure (with the tilt lift/lower controls) on aerator, making sure the correct depth of the plugs is reached. The dethatcher, landscape rake, and broom would all have to come in contact with the surface below the attachment (implement). These may have to have a small amount of down pressure used.

Manufacture of the apparatus would be well within the ken of an ordinary artisan in the relevant art, upon consulting the description provided in this application.

As can be easily understood from the foregoing, the basic concepts of the present invention may be embodied in a variety of ways. It involves both implement movement techniques as well as devices to accomplish the appropriate control. In this application, the movement control techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "support" should be understood to encompass disclosure of the act of "supporting"—whether explicitly discussed or not—and, conversely, were there effectively disclosure of the act of "supporting", such a disclosure should be understood to encompass disclosure of a "support" and even a "means for supporting" Such changes and alternative terms are to be understood to be explicitly included in the description. Further, each such means (whether explicitly so described or not) should be understood as encompassing all elements that can perform the given function, and all descriptions of elements that perform a described function should be understood as a non-limiting example of means for performing that function.

Any patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references or other information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

Thus, the applicant(s) should be understood to have support to claim and make a statement of invention to at least: i) each of the implement movement control devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) an apparatus for performing the methods described herein comprising means for performing the steps, xii) the various combinations and permutations of each of the elements disclosed, xiii) each potentially dependent claim or concept as a dependency on each and every one of the independent claims or concepts presented, and xiv) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in *Hakim* v. *Cannon Avent Group, PLC*, 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 20 or any other claim" or the like, it could be re-drafted as dependent on claim 1, claim 15, or even claim 25 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A vehicle supported implement control apparatus for connection with a vehicle having a vehicle chassis and movable in a vehicle forward travel direction, said apparatus comprising:
    a mounting component that is stationary relative to said vehicle chassis;
    a shaft that is pivotally connectable with said mounting component so that, during apparatus operation, said shaft is rotatable relative to said mounting component only about an implement lift and lower axis about which an implement assembly may be raised and lowered, wherein said implement lift and lower axis is orthogonal to a vehicle forward travel direction;
    at least one structural component other than said shaft that, during said apparatus operation, is rotatable only about said implement lift and lower axis;
    wherein said shaft defines an implement tilt axis that passes along the length of said shaft, wherein said implement tilt axis is orthogonal to said implement raise and lower axis, said implement tilt axis defining right and left vehicle portions,
    a movable frame that, during said apparatus operation, is movable relative to said at least one structural component only through rotation about said implement tilt axis, wherein said shaft passes through at least part of said movable frame, and wherein said movable frame has right, left, front and rear movable frame portions;
    said apparatus further comprising:
    a first pair of actuators, each having two ends, each connected at one end with said right and left vehicle portion, respectively, and at an opposite end with said right and left movable frame portion, respectively;
    an implement assembly pivotally connected with said movable frame so that during said apparatus operation, said implement assembly is rotatable relative to an implement yaw axis that is substantially orthogonal to said implement tilt axis, said implement assembly having right and left implement assembly portions; and
    a second pair of actuators, each having two ends, each connected at one end with said right and left movable frame portion, respectively, and at an opposite end with said right and left implement assembly portions, respectively.

2. A vehicle supported implement control apparatus for connection with a vehicle having a vehicle chassis and movable in a vehicle forward travel direction as described in claim 1 wherein said movable frame is, with respect to said vehicle chassis, movable only relative to said first and second axes.

3. A vehicle supported implement control apparatus for connection with a vehicle having a vehicle chassis and movable in a vehicle forward travel direction as described in claim 1 further comprising a tilt bushing established around at least a portion of said shaft.

4. A vehicle supported implement control apparatus for connection with a vehicle having a vehicle chassis and movable in a vehicle forward travel direction as described in claim 1 wherein said implement assembly comprises a grading blade.

5. A vehicle supported implement control apparatus for connection with a vehicle having a vehicle chassis and movable in a vehicle forward travel direction as described in claim 1 wherein said implement assembly comprises an implement and a non-implement portion.

6. A vehicle supported implement control apparatus for connection with a vehicle having a vehicle chassis and movable in a vehicle forward travel direction as described in claim 1 further comprising an enhanced implement pitch controller connected with said implement assembly.

7. A vehicle supported implement control apparatus for connection with a vehicle having a vehicle chassis and movable in a vehicle forward travel direction as described in claim 6 wherein operation of said enhanced implement pitch controller does not effect change in spatial position of said movable frame.

8. A vehicle supported implement control apparatus for connection with a vehicle having a vehicle chassis and movable in a vehicle forward travel direction as described in claim 6 wherein said enhanced implement pitch controller rotatably moves said implement about an enhanced pitch axis that is more proximal said implement than is said implement lift and lower axis and that is orthogonal to said implement yaw axis.

9. A vehicle supported implement control apparatus for connection with a vehicle having a vehicle chassis and movable in a vehicle forward travel direction as described in claim 8 wherein said enhanced pitch axis is forward of a rearward most portion of said implement assembly.

10. A vehicle supported implement control apparatus for connection with a vehicle having a vehicle chassis and movable in a vehicle forward travel direction as described in claim 8 wherein said enhanced pitch axis is substantially parallel with said implement lift and lower axis.

11. A vehicle supported implement control apparatus for connection with a vehicle having a vehicle chassis and movable in a vehicle forward travel direction as described in claim 6 wherein said implement assembly is movable in at least four degrees of freedom.

12. A vehicle supported implement control apparatus for connection with a vehicle having a vehicle chassis and movable in a vehicle forward travel direction as described in claim 6 wherein said implement assembly is movable in at least two degrees of freedom relative to said movable frame.

13. A vehicle supported implement control apparatus for connection with a vehicle having a vehicle chassis and movable in a vehicle forward travel direction as described in claim 6 wherein said implement assembly comprises a right left implement movement controller that translationally moves said implement in left and right directions.

14. A vehicle supported implement control apparatus for connection with a vehicle having a vehicle chassis and movable in a vehicle forward travel direction as described in claim 6 wherein said implement assembly comprises a mechanism enabling rotation of said implement about an enhanced pitch axis.

15. A vehicle supported implement control apparatus for connection with a vehicle having a vehicle chassis and movable in a vehicle forward travel direction as described in claim 6 wherein said enhanced implement pitch controller comprises an enhanced implement pitch actuator.

16. A vehicle supported implement control apparatus for connection with a vehicle having a vehicle chassis and movable in a vehicle forward travel direction as described in claim 15 wherein said enhanced implement pitch actuator comprises a hydraulic cylinder.

17. A vehicle supported implement control apparatus for connection with a vehicle having a vehicle chassis and movable in a vehicle forward travel direction as described in claim 6 wherein said implement assembly comprises an implement.

18. A vehicle supported implement control apparatus for connection with a vehicle having a vehicle chassis and movable in a vehicle forward travel direction as described in claim 17 wherein said enhanced implement pitch controller has two ends and is connected with an implement of said implement assembly at one of said two enhanced implement pitch controller ends.

19. A vehicle supported implement control apparatus for connection with a vehicle having a vehicle chassis and movable in a vehicle forward travel direction as described in claim 18 wherein the other of said two enhanced implement pitch controller ends is connected with said movable frame.

20. A vehicle supported implement control apparatus for connection with a vehicle having a vehicle chassis and movable in a vehicle forward travel direction as described in claim 1 wherein said movable frame comprises an intermediate support between said front and back movable frame portions.

21. A vehicle supported implement control apparatus for connection with a vehicle having a vehicle chassis and movable in a vehicle forward travel direction as described in claim 20 wherein said movable frame defines two polygons.

22. A vehicle supported implement control apparatus for connection with a vehicle having a vehicle chassis and movable in a vehicle forward travel direction as described in claim 21 wherein said two polygons comprises two rectangles.

23. A vehicle supported implement control apparatus for connection with a vehicle having a vehicle chassis and movable in a vehicle forward travel direction as described in claim 21 wherein said two polygons share a common side.

24. A vehicle supported implement control apparatus for connection with a vehicle having a vehicle chassis and movable in a vehicle forward travel direction as described in claim 1 wherein said implement assembly comprises a right left implement movement controller that translationally moves said implement in left and right directions along a translation axis.

25. A vehicle supported implement control apparatus for connection with a vehicle having a vehicle chassis and movable in a vehicle forward travel direction as described in claim 24 wherein operation of said right left implement movement controller does not effect change in spatial position of said movable frame.

26. A vehicle supported implement control apparatus for connection with a vehicle having a vehicle chassis and movable in a vehicle forward travel direction as described in claim 24 wherein said implement assembly is movable in at least four degrees of freedom.

27. A vehicle supported implement control apparatus for connection with a vehicle having a vehicle chassis and movable in a vehicle forward travel direction as described in claim 24 wherein said implement assembly is movable in at least two degrees of freedom relative to said movable frame.

28. A vehicle supported implement control apparatus for connection with a vehicle having a vehicle chassis and movable in a vehicle forward travel direction as described in claim 24 further comprising an enhanced implement pitch controller connected with said implement assembly.

29. A vehicle supported implement control apparatus for connection with a vehicle having a vehicle chassis and movable in a vehicle forward travel direction as described in claim 28 wherein said implement assembly is movable in five degrees of freedom.

30. A vehicle supported implement control apparatus for connection with a vehicle having a vehicle chassis and movable in a vehicle forward travel direction as described in claim 28 wherein said implement assembly is movable in three degrees of freedom relative to said movable frame.

31. A vehicle supported implement control apparatus for connection with a vehicle having a vehicle chassis and movable in a vehicle forward travel direction as described in claim 24 wherein said right left implement movement controller is a right left implement movement actuator.

32. A vehicle supported implement control apparatus for connection with a vehicle having a vehicle chassis and movable in a vehicle forward travel direction as described in claim 24 wherein said implement assembly comprises an implement.

33. A vehicle supported implement control apparatus for connection with a vehicle having a vehicle chassis and movable in a vehicle forward travel direction as described in claim 32 wherein said right left implement movement controller has two ends and is connected with said implement at a first of said two right left implement movement controller ends.

34. A vehicle supported implement control apparatus for connection with a vehicle having a vehicle chassis and movable in a vehicle forward travel direction as described in claim 33 wherein said implement assembly further comprises a non-implement portion.

35. A vehicle supported implement control apparatus for connection with a vehicle having a vehicle chassis and movable in a vehicle forward travel direction as described in claim 34 wherein the other of said two right left implement movement controller ends is connected with said non-implement portion of said implement assembly.

36. A vehicle supported implement control apparatus for connection with a vehicle having a vehicle chassis and movable in a vehicle forward travel direction as described in claim 32 wherein said right left implement movement controller slidingly moves said implement relative to said movable frame along said translation axis.

37. A vehicle supported implement control apparatus for connection with a vehicle having a vehicle chassis and movable in a vehicle forward travel direction as described in claim 36 wherein said implement assembly further comprises a slide carriage with which said implement is slidingly engaged.

38. A vehicle supported implement control apparatus for connection with a vehicle having a vehicle chassis and movable in a vehicle forward travel direction as described in claim 1 wherein said first pair of actuators is operable to effect rotatable movement of said movable frame about said implement lift and lower axis and said implement tilt axis.

39. A vehicle supported implement control apparatus for connection with a vehicle having a vehicle chassis and movable in a vehicle forward travel direction as described in claim 1 wherein said second pair of actuators is operable to effect rotatable movement of said implement assembly about said third axis.

40. A vehicle supported implement control apparatus for connection with a vehicle having a vehicle chassis and movable in a vehicle forward travel direction as described in claim 39 wherein said second pair of actuators is operable to effect rotatable movement of said implement assembly about said implement yaw axis without moving said movable frame.

41. A vehicle supported implement control apparatus for connection with a vehicle having a vehicle chassis and movable in a vehicle forward travel direction as described in claim 1 wherein motion about said implement lift and lower axis effects a change in spatial position of said second pair of actuators, and motion about said implement tilt axis effects a change in spatial position of said first pair of actuators.

42. A vehicle supported implement control apparatus for connection with a vehicle having a vehicle chassis and movable in a vehicle forward travel direction as described in claim 1 wherein said ends of said first pair of actuators connected with said right and left vehicle portions are connected above said implement lift and lower axis.

43. A vehicle supported implement control apparatus for connection with a vehicle having a vehicle chassis and movable in a vehicle forward travel direction as described in claim 1 wherein said ends of said second pair of actuators connected with said right and left movable frame portions are each connected closer to said implement tilt axis than are said ends of said second pair of actuators that are connected with said right and left implement assembly portions.

44. A vehicle supported implement control apparatus for connection with a vehicle having a vehicle chassis and movable in a vehicle forward travel direction as described in claim 1 wherein said first axis is horizontal.

45. A vehicle supported implement control apparatus for connection with a vehicle having a vehicle chassis and movable in a vehicle forward travel direction as described in claim 1 wherein said implement assembly is movable relative to said movable frame.

46. A vehicle supported implement control apparatus for connection with a vehicle having a vehicle chassis and movable in a vehicle forward travel direction as described in claim 1 further comprising a manually operable hydraulic control system to which said actuators are responsive.

47. A vehicle supported implement control apparatus for connection with a vehicle having a vehicle chassis and movable in a vehicle forward travel direction as described in claim 1 wherein said actuators are manually operated using levers.

48. A method for controlling a position of a vehicle supported implement comprising the steps of:
  operating a first pair of actuators to pivot a shaft and at least one structural component other than said shaft about a horizontal axis that is orthogonal to a vehicle forward travel direction in order to control height of an implement assembly above an underlying ground surface, said shaft and said at least one structural component rotatable only about said horizontal axis;
  operating said first pair of actuators to rotate a movable frame about an axis along the length of said shaft, thereby controlling a tilt orientation of said implement assembly;
  while performing said step of operating said first pair of actuators to rotate a movable frame about an axis along the length of said shaft, rotating said movable frame relative to said at least one structural component;

operating a second pair of actuators to controllably change an angle said implement makes with a forward travel direction of the vehicle supporting said implement; and operating an enhanced implement pitch controller to control a pitch orientation of an implement of said implement assembly without affecting spatial positions of any of said actuators of said first and second pairs of actuators.

49. A method for controlling a position of a vehicle supported implement as described in claim 48 further comprising the step of operating a right left implement movement controller to translationally move said implement in left and right directions along a translation axis without affecting spatial positions of any of said actuators of said first and second pairs of actuators or of said enhanced implement pitch controller.

50. A method for controlling a position of a vehicle supported implement as described in claim 48 wherein said step of operating a second pair of actuators to controllably change an angle a longitudinal axis of said implement makes with a forward travel direction of the vehicle supporting said implement comprises the step of operating a second pair of actuators to controllably change an angle said implement longitudinal axis makes with a forward travel direction of the vehicle supporting said implement without changing an angle an implement tilt axis makes with with a horizontal axis.

51. A method for controlling a position of a vehicle supported implement as described in claim 48 wherein said step of operating said first pair of actuators to control a tilt orientation of said implement assembly comprises the step of operating said first pair of actuators to rotate said movable frame about a shaft passing therethrough.

52. A method for controlling a position of a vehicle supported implement as described in claim 51 wherein said step of operating said first pair of actuators comprises the step of operating said first pair of actuators to rotate said movable frame about a shaft having a tilt bushing established therearound.

53. A method for controlling a position of a vehicle supported implement as described in claim 51 wherein said step of operating said first pair of actuators to rotate said movable frame comprises the step of operating said first pair of actuators to rotate a movable frame that comprises front and rear support portions and an intermediate support therebetween.

54. A method for controlling a position of a vehicle supported implement as described in claim 51 wherein said step of operating said first pair of actuators to rotate said movable frame comprises the step of operating said first pair of actuators to rotate a movable frame that defines two polygons.

55. A method for controlling a position of a vehicle supported implement as described in claim 54 wherein said two polygons are two rectangles.

56. A method for controlling a position of a vehicle supported implement as described in claim 55 wherein said two rectangles share a common side.

57. A method for controlling a position of a vehicle supported implement as described in claim 48 wherein said steps of operating each comprise the step of hydraulically operating through manual manipulation of handles.

58. A method for controlling a position of a vehicle supported implement as described in claim 48 wherein said steps of operating each comprise the step of manually operating through levers.

59. A method for controlling a position of a vehicle supported implement as described in claim 48 wherein said step of operating a second pair of actuators to controllably change an angle said implement makes with a forward travel direction of said vehicle comprises the step of operating a second pair of actuators without affecting spatial positions of any of said first pair of actuators.

60. A method for controlling a position of a vehicle supported implement as described in claim 48 wherein said implement is a grading blade.

61. A method for controlling a position of a vehicle supported implement as described in claim 48 wherein said vehicle supported implement is a tractor supported implement.

62. A method for controlling a position of a vehicle supported implement as described in claim 61 wherein said tractor supported implement is a tractor belly mounted grading blade.

63. A method for controlling a position of a vehicle supported implement as described in claim 48 further comprising the step of working underlying material.

64. A vehicle supported implement control apparatus for connection with a vehicle having a vehicle chassis and movable in a vehicle forward travel direction as described in claim 1 wherein said at least one structural component other than said shaft that, during said apparatus operation, is rotatable only about said implement lift and lower axis comprises a lift/lower tilt bracket.

65. A vehicle supported implement control apparatus for connection with a vehicle having a vehicle chassis and movable in a vehicle forward travel direction as described in claim 1 wherein said at least one structural component other than said shaft that, during said apparatus operation, is rotatable only about said implement lift and lower axis comprises a lift/lower bushing.

66. A method for controlling a position of a vehicle supported implement as described in claim 48 wherein said step of operating a first pair of actuators to pivot a shaft and at least one structural component other than said shaft about a horizontal axis that is orthogonal to a vehicle forward travel direction in order to control height of an implement assembly above an underlying ground surface comprises the step of operating a first pair of actuators to pivot a shaft and a lift/lower tilt bracket about said horizontal axis.

67. A method for controlling a position of a vehicle supported implement as described in claim 48 wherein said step of operating a first pair of actuators to pivot a shaft and at least one structural component other than said shaft about a horizontal axis that is orthogonal to a vehicle forward travel direction in order to control height of an implement assembly above an underlying ground surface comprises the step of operating a first pair of actuators to pivot a shaft and a lift/lower bushing about said horizontal axis.

* * * * *